United States Patent [19]
Sinko

[11] Patent Number: 6,139,610
[45] Date of Patent: Oct. 31, 2000

[54] HYBRID PIGMENT GRADE CORROSION INHIBITOR COMPOSITIONS AND PROCEDURES

[75] Inventor: John Sinko, Mequon, Wis.

[73] Assignee: Wayne Pigment Corp., Milwaukee, Wis.

[21] Appl. No.: 09/319,231

[22] PCT Filed: Oct. 2, 1998

[86] PCT No.: PCT/US98/20801

§ 371 Date: Jun. 3, 1999

§ 102(e) Date: Jun. 3, 1999

[87] PCT Pub. No.: WO99/18044

PCT Pub. Date: Apr. 15, 1999

Related U.S. Application Data

[63] Continuation-in-part of application No. 08/942,932, Oct. 2, 1997, abandoned, which is a continuation-in-part of application No. 08/587,817, Jan. 4, 1996, abandoned.

[51] Int. Cl.$^7$ .......................... C04B 14/36; C04B 16/00; C09C 1/04; C09D 5/08

[52] U.S. Cl. ..................... 106/14.44; 106/14.05; 106/14.41; 106/14.42; 106/14.43; 106/419; 106/431; 106/436; 106/442; 106/445; 106/447; 106/448; 106/450; 106/456; 106/457; 106/459; 106/460; 106/461; 106/466; 106/471; 106/499; 524/175; 524/176

[58] Field of Search ................ 106/14.05, 14.41, 106/14.44, 419, 14.42, 14.43, 431, 436, 442, 445, 447, 448, 450, 456, 457, 459, 460, 461, 466, 471, 499; 524/175, 176

[56] References Cited

U.S. PATENT DOCUMENTS

| | | | |
|---|---|---|---|
| 4,329,381 | 5/1982 | Eschwey et al. | 106/14.37 |
| 5,176,894 | 1/1993 | Sinko | 423/368 |
| 5,487,779 | 1/1996 | Sinko | 106/480 |
| 5,558,706 | 9/1996 | Sinko | 106/480 |

*Primary Examiner*—Anthony Green
*Attorney, Agent, or Firm*—Ryan Kromholz & Manion, S.C.

[57] ABSTRACT

A corrosion-inhibiting composition for application to a metal substrate, such as steel, silver, copper or aluminum, includes a film-forming organic polymer component and a dispersed pigment phase of a stable unitary hybrid which contains organic and inorganic solid phase constituents interfaced at a micro-crystalline level, which are inseparable by physical separation procedures and which display uniphase behavior. The inorganic phase includes a cation selected from Zn, Al, Mg, Ca, Sr, Ti, Zr, Ce and Fe and an anion selected from phosphates, polyphosphates, phosphites, molybdates, silicates and cyanamides. The organic phase includes zinc or alkyl-ammonium (for example: cyclohexyl-ammonium, di-cyclohexyl-ammonium, octyl-ammonium) salts of organic mercapto- and thio-compounds or their alkyl-substituted derivatives, as follows: mercaptobenzothiazole, mercaptothiazoline, mercaptobenzimidazole, mercaptoimidazole, 2,5-dimercapto-1,3,4-thiodiazole, 5,5-dithio-bis(1,3,4-thiadiazole-2(3H)-thione, mercaptobenzoxazole, mercaptothiazole, mercaptotriazole, mercaptopyrimidine, mercaptopyridine, mercaptoquinoline, alkyl- and cycloalkyl mercaptanes, -alkyl- or N-cycloalkyl-dithiocarbamates, O-alkyl- or O-cycloalkyl-dithiocarbonates, O,O-dialkyl- and O,O-dicycloalkyl-dithiophosphates.

24 Claims, 7 Drawing Sheets

6,139,610

HYBRID PIGMENT GRADE CORROSION INHIBITOR COMPOSITIONS AND PROCEDURES

RELATED APPLICATION

This application is a continuation-in-part of application Ser. No. 08/942,932, filed Oct. 2, 1997, abandoned which is a continuation-in-part of Ser. No. 08/587,817 filed Jan. 4, 1996, now abandoned, and is also in continuation of International Application Serial number PCT/US 98/20801, filed Oct. 2, 1998, titled "Hybrid Grade Corrosion Inhibitor Compositions and Procedures."

FIELD OF INVENTION

The present invention relates to chemical compositions and processes for inhibition of corrosion of metals. The preferred compositions are pigment grade products suitable for addition to primers, paints and other coating compositions.

BACKGROUND OF THE INVENTION

Organic protective coatings represent the most versatile and economical technology available for protection of metals against atmospheric corrosion. Corrosion inhibitive primer coatings are solid composites, comprising finely divided, usually multi-component, inorganic pigment phases dispersed in continuous organic polymer phases, which provide strong adherence to the protected metal substrates.

Although the physical characteristics of primers are reinforced by the dispersed inorganic pigment phases, they nevertheless remain permeable to $O_2$, $H_2O$ and air-borne pollutants. As a consequence, thin organic coatings do not prevent atmospheric corrosion of metals, unless they are specifically formulated with active corrosion inhibitor constituents, included in the pigment phase.

Contrary to appearances, a metal substrate protective primer, in equilibrium with its environment is a dynamic medium which accommodates several concurrently occurring physical and chemical processes, in which water, always present due to the resin phase's permeability, plays a critical role.

Water content affects the physical integrity of organic coatings in several ways. Most importantly, in this specific sense, it dissolves all soluble components (inclusive of pigments) to saturation concentrations and supports in situ diffusional transport processes of dissolved constituents. Water accumulates preferentially at metal-coating interfaces, causing loss of interfacial adhesion and more specifically supporting the electrochemical processes of metal corrosion. Paradoxically, in actively pigmented organic coatings water supports the inhibition of metal substrates' atmospheric corrosion, as well, by in situ solubilization of active pigments. Corrosion inhibitor pigment constituents of protective primers can be regarded as built in reservoirs of corrosion inhibitive species.

Commercially available chemically active corrosion inhibitor pigments used for Fe, Al, or Cu protection, belong exclusively to only a few classes of inorganic compounds, such as chromates, phosphates or polyphophates, molybdates, borates, silicates and phosphites of Zn, Ca, Sr, Ba, Al, Mg, Pb, Cr, Fe, or various combinations of these anionic and cationic species. Chromates and some of the latter cationic species, particularly Ba, Pb and Cr are known to be toxic. Transition metal derivatives of hydrogen cyanamide, particularly ZnNCN are also known for pigment grade application, limited, however, to special mirror backing coatings intended for Ag protection.

Generally, the active inhibitor species are the anionic constituents. Cations present, however, determine important physical properties of pigments such as solubility. Chromates, and specifically $SrCrO_4$, are the standard of the industry, being the most versatile, applicable on all metal substrates such as Fe and specifically Al alloys and being highly effective, although toxic, pigment grade corrosion inhibitors. It is the redox activity of chromate species, accountable for their inhibitive efficiency which provides interference with corrosion processes in both, anodic and cathodic environments.

In contrast with chromates, all other active corrosion inhibitive pigments, more specifically, the anionic constituents of phosphates, molybdates, silicates, borates, phosphites and cyanamides are "redox inactive" under usual metal corrosion conditions. The consequences of "redox inactive" inhibitive mechanisms are significant. It can be generally stated that non-chromate based corrosion inhibitor pigments are less effective and qualitatively inferior, but non-toxic alternatives of chromates. As a consequence, for aircraft coatings used for aluminum protection and for coil coatings, where top corrosion inhibitive performances are required, $SrCrO_4$ has no equally effective non-chromate alternatives. Development of effective and non-toxic alternative to chromates remains one of the major objectives of contemporary corrosion inhibitor chemistry.

As is well known, there is a large arsenal of organic corrosion inhibitors employed in industrial practice, limited, however, to gas phase and liquid medium applications. Logically, it would be expected, that the same arsenal would be appropriate for paint and coating applications as well, which, paradoxically, is not the case. The apparent contradiction is understandable by considering that in paint and coatings related applications, in addition to corrosion inhibitive efficiency, "pigment grade" qualities are required, as well.

Besides general quality requirements, "pigment grade" quality is defined by an additional, quite limiting set of parameters. Most important of these are non-volatility, solid consistency, specific gravity of 2.5–5.0, effective but limited solubility in water, virtual insolubility in organic solvents, absence of deleterious effects on coating's mechanical properties and, notably, no interference with curing processes. It will be apparent in this sense, that coatings related applications are not compatible with physical properties such as volatility, excessive solubility in water or organic media, which are however, critical requirements of gas phase or liquid medium related applications of organic corrosion inhibitors, respectively.

Various organic compounds with —SH functionality, such as thiols, derivatives of dithiocarbonic, dithiocarbamic and dithiophosphoric acids, are known to exhibit corrosion inhibitive activity. For example, diverse thio-organic compounds, such as N-containing heterocyclic mercapto derivatives, i.e, 2-mercaptobenzothiazole (MBT), are well known corrosion inhibitors employed practically exclusively in dissolved form, as a functional component of aqueous, polar organic or hydrocarbon based liquid systems. Typical applications of organic corrosion inhibitors in water, polar organic solvents or hydrocarbons include heat exchangers, anti-freeze systems, steam condensers or hydraulic oils, metal cutting liquids, and lubricants. Water soluble related Na or K salts (for example Na-MBT) or "thio" compounds in their more hydrocarbon soluble acidic form (such as MBT) are preferred in the former or the latter applications, respectively.

U.S. Pat. No. 4,329,381 shows the use of toxic Pb and Zn salts of selected five or six membered nitrogen-containing heterocyclic mercapto derivatives, notably $Zn(MBT)_2$, as corrosion inhibitor components of organic coatings, more specifically by incorporating such compounds as finely divided, distinct solid component phases into paint or coating systems, more specifically for protection of Fe.

A significant limitation of this concept is that technical grade $Zn(MBT)_2$, when produced according to the procedures described in the '381 patent contains high amounts of unreacted MBT. Thus, when formulated as a finely divided, distinct low specific gravity component in paint systems, these ingredients interfere with and inhibit the curing process of oil alkyd resin based coatings. This is a significant limitation, because it is estimated that about 60% of all primers intended for metal protection are oil alkyd resin based.

Two known procedures for synthesis of MBT derivatives and specifically of $Zn(MBT)_2$ are described in the '381 patent:

A. Conversion into $Zn(MBT)_2$ of aqueous mixed suspension containing ZnO (or alternatively, basic zinc carbonate) and MBT performed with extensive agitation and heating at approximately 100° C., in the presence of catalytic amounts of acetic acid, according to:

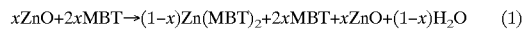

$$xZnO+2xMBT \rightarrow (1-x)Zn(MBT)_2+2xMBT+xZnO+(1-x)H_2O \quad (1)$$

B. By double decomposition or precipitation, using aqueous solutions of NaMBT and zinc salts according to:

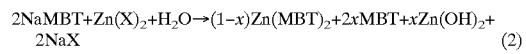

$$2NaMBT+Zn(X)_2+H_2O \rightarrow (1-x)Zn(MBT)_2+2xMBT+xZn(OH)_2+2NaX \quad (2)$$

where x>0, X=Cl(−), $NO_3$(−), etc.

As will be demonstrated in Comparative Example 1, neither procedure is suitable as disclosed, because of inability to yield reasonably pure $Zn(MBT)_2$ necessary for paint applications, but rather a mixture containing quite high amounts of unreacted MBT and ZnO is produced. Notably, this is true as to all commercially available technical grade $Zn(MBT)_2$ of diverse origin. For example, the commercial product offered by the Bayer Corporation under the trade name Vulkacit ZM contains in excess of 13% of free MBT.

It is important to observe that unreacted MBT content in technical grade $Zn(MBT)_2$ has significant adverse consequences with respect to suitability of such products in paint-coating applications. Specifically, if added as a finely divided distinct solid component into paint systems, technical grade $Zn(MBT)_2$ inhibits the curing process of oil alkyd resin based coatings. Conversely, as it was also discovered that $Zn(MBT)_2$ purified by solvent extraction does not display any cure inhibitive activity even at considerably higher concentrations in medium oil alkyds. (See Comparative Example 1).

As for the chemical mechanism which causes the curing inhibition, free MBT reacting with Co(II) or Pb(II) species (the active constituents of driers typically used in oil alkyd paint formulations), is hypothesized. Consequently, with respect to interference with curing processes, similar behavior should be considered typical for all thio-organic compound families with —SH functional groups, as well as for related zinc salts of technical grade.

Quantitative determination of unreacted MBT content of $Zn(MBT)_2$ can be conveniently carried out gravimetrically, by repeated extraction in acetone, or it can be estimated by IR spectroscopy. Intense absorption bands situated at 1496 and 1425 cm(−1) of the related spectrum, are characteristic for MBT. (See Comparative Example 1)

An additional limitation of the concept of the '381 patent relates to the fact that the specific gravity of $Zn(MBT)_2$ (1.5–1.7), and generally that of other mercapto derivatives, is quite low in comparison with such values typical for other components of a paint system's dispersed inorganic phase, which range from 2.5 to 5.0, or with density values of cured coatings of about 2.0. Notably, also, the zinc and lead salts of mercapto derivatives form ordinary mixtures with other components of the dispersed pigment phase.

As is known, shelf-stable paint systems' dispersed solid phases, usually multi-component ordinary mixtures of the constituents of the same, tend to segregate by "flooding", if they contain components with appreciably different specific gravities. Due to convective processes related to solvent evaporation, flooding occurs during the curing of freshly applied coatings, resulting in predominant accumulation, at the coating-air interface, of the dispersed solid phase's low specific gravity components and ultimately, in an anisotropic composition, and consequently, a reduced protective capacity of the resultant coatings. These phenomena are well known with respect to paint applications colored by organic pigments.

Since low specific gravity values are typical for zinc salts formed by relatively "bulky" organic moieties, such as $Zn(MBT)_2$, segregation by flooding has relevance to the application of such compounds as paint additives and constitutes a considerable shortcoming thereof.

There are essentially three different structural states in which two (or more) microcrystalline or amorphous component phases of distinctively different chemical composition can co-exist as constituents of multi-phase and finely divided solid systems: ordinary physical mixtures, microcomposites and solid solutions.

Solid solutions, although formed spontaneously, are not commonly found in multi-phased solid systems. In some cases, however, distinct combinations of three or more anionic and cationic constituents, which ordinarily form two or more solid phases of distinct chemical composition, in special conditions form unified solid phases of complex chemical composition. Such unified phases are characterized by uniform distribution at molecular level of all constituent ionic species.

Ordinary mixtures of finely divided (and normally polydispersed) solid phases of different chemical composition are constituted of distinct and separable microparticles of the distinct component phases, mixed and uniformly distributed in the system. Ordinary mixtures can be prepared by simple mechanical procedures. However, they are often formed spontaneously in chemical processes as well, such as during concurrent or subsequent formation by precipitation of two or more solid phases in aqueous systems.

Conversely, micro-composite (multi-phase and finely divided) solid systems are constituted of microparticles, containing distinctly identifiable, but physically inseparable component phases of different chemical composition which form common interfaces and are held together by chemical forces. In some cases composite microparticles possess a structural configuration of a coating-core type, often formed in some heterogenous chemical processes, such as described in my U.S. Pat. No. 5,176,894, wherein a finely divided suspension of an essentially insoluble solid reactant is reacted with a dissolved component reactant of a liquid phase and consequently is converted into a finely divided suspension of a solid reaction product, which is insoluble in the reaction medium. During the course of the reaction the suspended solid phase consists of composite micro-particles of a coating-core configuration, in which both solid component phases, i.e., the reaction product coating and the reactant core are simultaneously present, separated and bound together by an interface which in many cases is of a generally spherical shape, but also may consist of other configurations such as lamina, etc. This mechanism, obviously, implies the reagent species' continuous diffusion through the coating phase toward the reactant core and generally, the reaction is diffusionally impeded. Thus, by preventing completion of the reaction, the solid product's micro-composite structure is preserved.

Notably, there are also numerous examples known to the art regarding preparation of microcomposite multi-phase solid systems by, in comparison, a quite different process and mechanism. Known as "particle encapsulation" procedures, widely used in the pigment manufacturing industry, are the formation by precipitation of chemically inert coatings of diverse chemical composition on the surfaces of finely divided solids in aqueous suspension.

The microcomposite structures of multi-phase solids prepared in aqueous processes, commonly are preserved throughout typical pigment manufacturing operations, which include filtration, dehydration and grinding. Pertinent experimental data are presented in Comparative Examples 2.1 and 2.2.

Another significant limitation of the concept of patent '894 is, that zinc salts of thio-compounds, such as $Zn(MBT)_2$, in ordinary mixtures with zinc phosphate, the inhibitor pigment specified in the patent, do not form synergistic systems and do not display synergistically enhanced corrosion inhibition performance.

In view of all of these considerations, a need has existed for improved corrosion inhibitor systems.

SUMMARY OF THE INVENTION

It is a principal object of the present invention to provide a new class of organic-inorganic hybrid corrosion inhibitor pigments which overcome the above discussed disadvantages related to segregation and to inhibition of coating curing processes. It is a further important object to provide organic-inorganic microcomposite hybrid corrosion inhibitor pigments which display synergistically enhanced effectiveness with respect to corrosion inhibition. In accordance with an important aspect of this invention, the multi-phase hybrid corrosion inhibitor pigments of this invention are not separable into the individual constituent phases by means of procedures such as floatation, flooding or sedimentation in suspensions. In accordance with an important embodiment, thio-organic salts, such as $Zn(MBT)_2$, among others, and inorganic constituents such as ZnNCN are incorporated into pigment grade organic-inorganic hybrids. The hybrids are found to possess heretofore undiscovered corrosion inhibiting properties on a wide variety of metals.

In accordance with further aspects of the invention, novel procedures are disclosed for synthesis of inorganic/organic hybrids which are in the characteristic micro-composite structural state.

It is the interface formed between the constituent organic and inorganic phases, which is a characteristic structural feature of microcomposite hybrids obtained pursuant to the present invention. As a consequence, the organic and inorganic solid phase constituents, interfaced at a microcrystalline or "crystallite" levels, form unitary hybrids, which display typical uniphase behavior with respect to some physical properties, critical in paint applications.

In contrast to ordinary physical multi-phase organic-inorganic mixtures, finely divided pigment grade hybrids of the present invention do not segregate into phase components by physical processes such as flotation or flooding. Importantly, such segregation does not occur when these hybrids are dispersed in liquid phases such as paint vehicles. Furthermore, as a direct consequence of pigment grade hybrid's uniphase behavior, pertinent specific gravity, pH and solubility values are approximately weighed averages of the component phase's characteristic values.

It is particularly important to note, that pigment grade hybrid products according to the present invention, and particularly those containing $Zn(MBT)_2$, do not display cure inhibitive activity in alkyd resin based paint systems. Consequently, they are actual pigment grade products, compatible with all paint vehicle systems, as documented hereinafter. In addition to coatings, the hybrid corrosion inhibitors of this invention have applicability to other polymer-based systems where inhibition of metal corrosion is important. For example, adhesive systems intended for use in bonding together of metals, especially aluminum in aircraft applications, can be provided with corrosion resisting properties by addition thereto of the pigment grade hybrids of this invention.

Most importantly, pigment grade hybrids produced according to the present invention display synergistic behavior with respect to metal corrosion inhibition. Manifestations of the novel pigment grade hybrids' synergistic behavior are their ability to effectively retard all of the important metals' corrosion, particularly of Fe, Al, Cu and Ag, as well as their compatibility with all paint vehicle systems, inclusive of water reducible and solvent based alkyds. More specifically, synergistic behavior with respect to corrosion inhibition is understood as the capacity of pigment grade hybrid products to display, in identical coating formulations, similar or generally enhanced corrosion inhibitive performance in comparison to state of the art corrosion inhibitor pigments typically applied on all of the above-noted metal substrates. The comparison in this sense refers to all individual phase components of related hybrid compositions, as well.

It is important to observe, however, that synergistic behavior with respect to corrosion inhibition is not an ordinary characteristic provided just any randomly selected mixtures of chemically different, finely divided solid constituents containing inhibitor species. A high degree of synergy, rather, is an unpredictable property of very few multi-phase pigment systems of distinct chemical and phase compositions, having two, or typically more, solid component phases, preferably all insoluble in organic media, which are, however, water soluble to an effective, but limited extent.

Considering, that atmospheric corrosion of metals, or corrosion inhibition by pigmented organic coatings are essentially aqueous processes, the primary importance of solubility-related parameters of pigments becomes evident. With respect to aqueous solubility, multi-phase organic-inorganic hybrid products of the present invention, offer specific benefits in comparison to simple, mono-phase inhibitor pigments. According to applicable solubility rules, the former tend to saturate aqueous phases, with which they have contact, in multiple-constituent ionic species. Based on these considerations, synergistic behavior with respect to corrosion inhibition of multi-phase pigments which have distinct chemical and phase compositions, can be understood to be the consequence of cooperative, rather than antagonistic, contributions of all solubilized active ionic species involved in the inhibition process, including organic species.

As used herein, "microparticles" are defined as particles having diameters of approximately 0.5 to 20 microns. The preferred particles are in an approximate diameter range of 1 to 10 microns.

Briefly, the invention provides corrosion inhibiting compositions for application to metal substrates, in which a film-forming continuous organic polymer phase contains a dispersed finely divided, corrosion inhibiting microcomposite pigment phase, consisting of corrosion inhibitor inorganic and organic component phases which are distinctively identifiable, however inseparable by physical means, such as flooding, flotation or sedimentation.

The corrosion inhibitor inorganic component phase typically includes selected phosphates, phosphites, molybdates, borates, silicates and cyanamides, specifically ZnNCN or mixtures or solid solutions thereof. In accordance with the preferred embodiment of the present invention, the corrosion inhibitor organic component phase is a zinc-, or an alkyl- or cycloalkyl ammonium salt of selected thio-organic compounds, such as mercaptans, hetero-cyclic mercapto derivatives, derivatives of dithio-carbonic, dithio-carbamic and dithio-phosphoric acids.

The invention, further, offers a method of providing corrosion resistance to a metal substrate, which includes applying to the substrate's surface a film-forming organic coating composition containing a dispersed pigment phase, which pigment phase contains a hybrid organic-inorganic product in a corrosion protecting amount. As used herein, "coating composition" is intended to refer generally to film-forming compositions such as paints, lacquers, adhesives, etc. suitable for application to metal substrates.

The invention also provides methods for synthesis of organic-inorganic hybrid corrosion inhibitor microcomposite products, such as by reacting selected mercaptans with aqueous suspension of ZnNCN, or by the distinctively different way, by co-precipitation (double decomposition) of dissolved mixtures of organic and inorganic corrosion inhibitor anionic species with dissolved mixtures of selected cationic species. Additionally, the present invention discloses a procedure to convert ordinary mixtures of distinctively different solids into microcomposites, by particle encapsulation or adsorption of freshly precipitated hydrous $ZrO_2$, or alternatively of Al, Zn silicates or phosphates onto the surface of finely divided and dispersed solid particles.

In accordance with yet another aspect of the invention, novel corrosion inhibiting hybrid pigments and corrosion preventing compositions and processes, based on poly-thiols, especially di-, tri-, and tetra-mercapto derivatives are provided with particular applicability to prevention of corrosion of silver and aluminum.

DETAILED DESCRIPTION OF THE INVENTION

Figure 1:
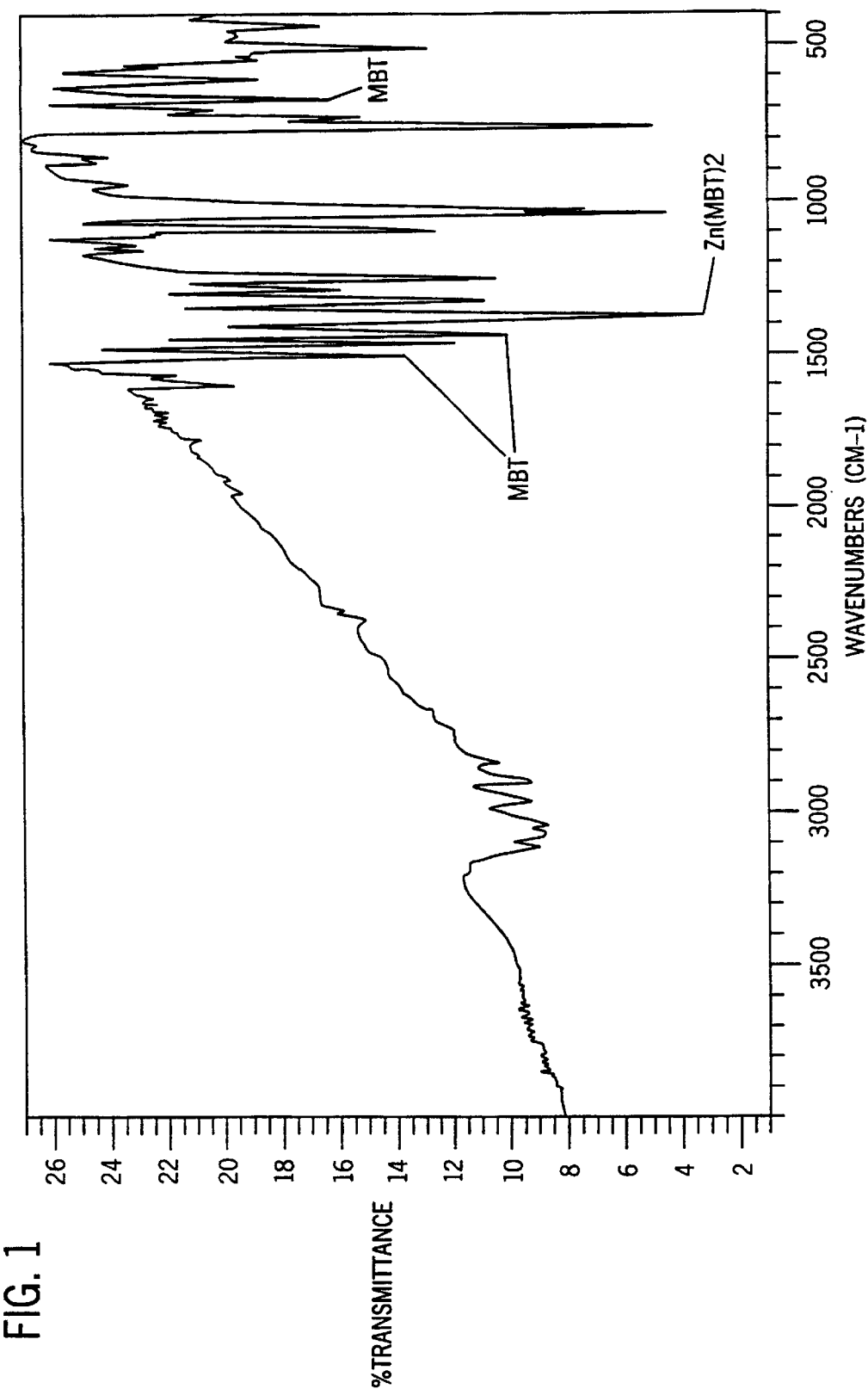
FIGS. 1–7 are graphical prints representing IR spectra of products produced pursuant to the invention.

The synthesis of pigment grade organic-inorganic hybrid products, pursuant to the present invention is preferably accomplished by combining selected organic and inorganic constituents, in preferred stoichiometric ratios according to procedures which promote formation of organic-inorganic interfaces. Inorganic constituents preferred according to the present invention are as follows:

Cations: Zn(II), Al(III), Mg(II), Ca(II), Sr(II), Ti(IV), Zr(IV), Ce(III or IV), Fe(II or III);

Anions: Cyanamides, NCN(2−); phosphates, $PO_4$(3−); poly-phosphates, such as $P_2O_7$(4−); phosphites, $HPO_3$ (2−); molybdates, $MoO_4$(2−); silicates, $SiO_3$ (2−) carbonates, $CO_3$ (2−) and borates such as $BO_2$(−).

Accordingly, preferred inorganic compounds typically present in corrosion inhibitive hybrids synthesized pursuant to the present invention, are: ZnNCN; $Zn_3(PO_4)_2 \cdot (H_2O)_x$; x=2–4; $ZnHPO_3$; $SrHPO_3$; $MgHPO_4 \cdot (H_2O)_3$; $AlPO_4$; $CaSiO_3$; Sr— or $CaMoO_4$; and combinations of the same.

Selected organic constituents of hybrid pigments synthesized according to the present invention are the zinc salts, cyclo-alkyl-ammonium or alkyl-ammonium (For example: cyclohexyl-ammonium, di-cyclohexyl-ammonium, octyl-ammonium) salts of organic mercapto- and thio-compounds, or their alkyl-substituted derivatives, as follows: mercaptobenzothiazoles, mercaptothiazolines, mercaptobenzimidazoles, mercaptoimidazoles, 2,5-dimercapto-1,3,4-thiodiazole, 5,5-dithio-bis(1,3,4-thiadiazole-2(3H)-thione, mercaptobenzoxazoles, mercaptothiazole, mercaptotriazole, mercaptopyrimidine, mercaptopyridine, mercaptoquinoline, alkyl- and cyclo-alkyl mercaptanes, N-alkyl- or N-cycloalkyl-dithiocarbamates, O-alkyl- or O-cycloalkyl-dithiocarbonates, O,O-dialkyl- and O,O-dicycloalkyl-dithiophosphates. Various other di-, tri-, and tetra-mercapto derivatives have also been found applicable to the practice of the invention, for example, dithiocyanuric acid, trithiocyanuric acid, dimercapto pyridine, 2,4-dithiohydantoin, and 2,4-dimercapto-6-amino-5-triazine. Also applicable are dimers or oligomers of di- or tri-mercapto derivatives, containing —S—S— functional groups obtained by oxidation of the former.

For convenience, the following acronyms of some of the preferred thio-organic products' scientific names are used throughout the present text:

| Acronyms | Scientific Names of Thio-organics |
|---|---|
| MBT | Mercaptobenzothiazoles |
| $Zn(MBT)_2$ | Zinc-Mercaptobenzothiazolate |
| d-Cy-MBT | di-Cyclohexyl-Mercaptobenzothiazolate |
| DMTD | 2,5-di-mercapto-1,3,4-thiadiazole |
| MTH | Mercaptothiazolines |
| MBO | Mercaptobenzoxazoles |
| MBI | Mercaptobenzimidazoles |
| CyDC | Cyclohexyl-N-Dithiocarbamate |
| n-pDC | n-propyl-O-Dithiocarbonate |
| DTP | O,O-di-Alchyl-Dithiophosphates |
| CyM | Cyclohexyl-Thiolate, (-mercaptane) |

The preferred process for synthesis, without by-products, of organic-inorganic hybrids is exemplified by Reactions 3 and 4, the former being an adaptation of Reaction 1, performed in aqueous medium heated to 85–95° C., as follows:

$$ZnO + 2x.MBT \rightarrow xZn(MBT)_2/(1-x)ZnO + x.H_2O \quad (3)$$

where 2x=0.2 to 0.3, and ZnO is finely divided with average particle size of 0.25 micron or less. As used herein, "/" symbolizes a micro-composite structural state between solid component phases.

In contrast with Reaction 1, Reaction 3 is carried out with a large excess of ZnO (2x=0.2–0.3). As a result, the equilibrium reaction mixture does not contain unreacted MBT. If however 2x=0.5–1.0, the equilibrium reaction mixture contains significant amounts of unreacted MBT, which, as learned pursuant to the present invention, can be minimized by post-addition of $Zn(NO_3)_2$, according to Reaction 2.

It was further learned pursuant to the present invention that the equilibrium mixture of Reaction 3 reacts readily with $H_2NCN$, as follows:

$$xZn(MBT)_2/(1-x)ZnO+(1-x)H_2NCN \rightarrow xZn(MBT)_2/(1-x)ZnNCN+(1-x)H_2O \quad (4)$$

Reaction 4, or a variation thereof, is the process generally preferred for the formation of organic-inorganic interfaces, characteristic to pigment grade hybrid products according to the present invention. As hereinafter further disclosed, this procedure offers significant advantages, the absence of soluble by-products being one of the most important.

Considering that the product of Reaction 3, is a microcomposite of $Zn(MBT)_2$ and $ZnO$, in a coating-core structural geometric configuration, the occurrence of reaction 4 implies that $H_2NCN$ diffusion to the ZnO core is not obstructed.

The final product of Reaction 4, symbolized by the theoretical formula $[xZn(MBT)_2/yZnNCN]$, where preferably $x=0.2–0.3$ and $y=0.7–0.8$, represents one of the preferred two-phase organic-inorganic hybrid corrosion inhibitor pigments of the present invention. The component phases are inseparable by physical processes such as flooding, flotation, or sedimentation in liquid media and thus are believed to be in a microcomposite structural state of a coating-core type.

It is important to observe also, if Reaction 4 is performed with less than stoichiometrically required amounts of $H_2NCN$, it yields three-phase hybrid products containing variable amounts of ZnO, presumably in core-coating structural configuration, symbolized by the formula:

$$[xZn(MBT)_2/yZnNCN/zZnO],$$

where $x+y+z=1$.

Notably, it was observed that alternatives of Reaction 3 followed by Reaction 4, can be performed with other thio-organic compounds, as well, more specifically with MTH and MBO. Consequently, organic-inorganic hybrid pigment grade corrosion inhibitors symbolized by $$[xZn(MTH)_2/yZnNCN$$

and $$xZn(MBO)_2/yZnNCN]$$

where preferably $x=0.2–0.3$ and $y=0.8–0.7$, can be produced.

These processes, however, are not generally applicable with all thio-organic compounds. Specifically, it was learned that although Reaction 3 applies also to DMTD and MBI, Reaction 4 is substantially obstructed. This observation is interpreted as a manifestation of the reaction products' micro-composite structure, in which freshly formed $Zn(DMTD)_2$ or $Zn(MBI)_2$ co-exist with unreacted ZnO presumably in a coating-core structural configuration. In contrast with MBT, MTH and MBO, where this apparently is not the case, $Zn(DMTD)_2$ and $Zn(MBI)_2$ form dense coatings on ZnO cores, thus preventing $H_2NCN$ diffusion.

In these cases, an alternative synthesis process was based on the same reactions performed in a reversed sequence:

$$ZnO+xH_2NCN \rightarrow xZnNCN/(1-x)ZnO+xH_2O \quad (5)$$

$$xZnNCN/(1-x)ZnO+2(1-x)DMTD \rightarrow xZnNCN/(1-x)Zn(DMTD)_2+(1-x)H_2O \quad (6)$$

It was experimentally proven, as an extension of Reaction 6 that ZnNCN, in aqueous suspension at higher than ambient temperatures, reacts readily with DMTD according to:

$$ZnNCN+2xDMTD \rightarrow Zn(DMTD)_2/(1-x)ZnNCN+xH_2NCN \quad (7)$$

where $x=0.2–0.3$.

Reaction 7, previously unknown to the art, constitutes a novel contribution of the present invention.

As hereinafter documented, Reaction 7 can be performed also with other mercaptans such as MBI, MBT (See Example 2), MBO and MTH. Reaction 7 is favored to a variable extent, as a function of the acidity of various mercaptans, generally stronger in comparison to $H_2NCN$ and the low solubility of the resultant zinc salts. A shortcoming of this procedure, although considered generally applicable for the purposes of the present invention, is the loss of valuable $H_2NCN$, which effectively limits its practical usefulness.

A distinct objective of the present invention is to synthesize organic-inorganic microcomposite hybrid corrosion inhibitor pigments comprising, in addition to the preferred organic constituents and cyanamides, other corrosion inhibitive anionic species or inorganic component phases such as phosphates, phosphites, silicates, molybdates and borates.

Incorporation of phosphates and phosphites into hybrid corrosion inhibitor pigments according to the present invention can be conveniently realized as zinc salts characterized by appropriate solubilities. To that end, the product of Reaction 3 can be reacted with $H_3PO_4$ or alternatively $H_3PO_3$, as follows:

$$\text{(Product of Reaction 3)}+2yH_3PO_4 \rightarrow xZn(MBT)_2/yZn_3(PO_4)_2(H_2O)_2/((1-(x+3y))ZnO+H_2O \quad (8)$$

It is preferable to perform Reaction 8 at ambient temperatures and to keep x $0.2–0.3$ and $y=0.1$. The ZnO component phase of the product of Reaction 8 can be further reacted with $H_2NCN$. Performed preferably at higher than ambient temperature and with some stoichiometrical excess of $H_2NCN$, Reaction 9 yields organic-inorganic hybrid corrosion inhibitor pigments including all component phases in a microcomposite structural state:

$$\text{(Product of Reaction 8)}+1.2(1-(x+3y))H_2NCN \rightarrow xZn(MBT)_2/yZn_3(PO_4)_2(H_2O)_2/zZnNCN+H_2O, \quad (9)$$

where $z=1.2(1-(x+y))$; and $x+y+z=1.0$.

Reactions similar to Reaction 9 also can be performed with MBO and MTH. Reaction 9 is important with respect to the practice of the present invention to synthesize multi-phase organic-inorganic hybrid pigments having synergistic corrosion inhibitive properties. It is based on the unexpected capability of $H_2NCN$ to react selectively with a ZnO core in the presence of previously formed component phases such as $Zn(MBT)_2$ (or alternatives) and zinc phosphate, resulting in multi-phase products with negligible contents of ZnO.

It was noted, however, that DMTD and MBI require alternative synthesis processes exemplified by:

$$ZnO+3xH_3PO_4 \rightarrow xZn_3(PO_4)_2(H_2O)_2/(1-3x)ZnO+H_2O \quad (10)$$

$$\text{(Product, Reaction 10)}+yH_2NCN \rightarrow xZn_3(PO_4)_2(H_2O)_2/yZnNCN/((1-(3x+y))ZnO+H_2O \quad (11)$$

$$\text{(Product, Reaction 11)}+zDMTD \rightarrow xZn_3(PO_4)_2(H_2O)_2/yZnNCN/zZn(DMTD)_2+H_2O \quad (12)$$

where, preferably, $x=0.1–0.15$; $y=0.3$ to $0.4$; $z=1-(3x+y)$ and $x+y+z=1.0$.

Corrosion inhibitive $SiO_3(2-)$ species are conveniently incorporated into multi-phase organic-inorganic hybrid pigments as finely divided pigment grade Wollastonite, a naturally occurring $CaSiO_2$ characterized by appropriate solubility and pH.

The preferred techniques, variations of Reactions 8 and 9, to incorporate finely divided pigment grade $CaSiO_3$ can be illustrated as follows: a. An aqueous mixed suspension of ZnO and finely divided $CaSiO_3$ (ordinary mixture) is prepared at a preferred 1:0.3–0.4 molar ratio. b. The mixed suspension is reacted with MBT or alternatives according to Reaction 3 at 2x=0.3. c. The resulting reaction product, an ordinary mixture of $CaSio_3$ and the product of Reaction 3 in aqueous suspension is subsequently reacted with $H_2NCN$ according to Reaction 4.

This procedure performed with MBT yields a reaction product described by the idealized phase composition formula of:

$$[0.17Zn(MBT)_2/ZnNCN+(0.35-0.5)CaSiO_3]$$

where [+] symbolizes an ordinary mixture state between solid component phases. The physical state of such reaction product is considered to be a uniform ordinary mixture of $CaSiO_3$ and the two-phase hybrid product of Reaction 4.

Similar synthesis processes are applicable to concurrently incorporate additional $HPO_3(2-)$ or $PO_4(3-)$ or mixtures thereof. The mixed suspension of ZnO and $CaSiO_3$, as above described, is reacted at higher than ambient temperature, with appropriate amounts of MBT, $H_3PO_4$ and $H_2NCN$, all reactants being preferably introduced into the reaction medium following the specified sequence. Under the specified reaction conditions, $Zn(MBT)_2$ and subsequently, $Zn_3(PO_4)_2(H_2O)_2$ formation is selectively favored, whereas (13):

$$CaSiO_3+2xH_3PO_4\rightarrow(1-3x)CaSiO_3/xCa_3(PO_4)_2/3xH_2SiO_3 \quad (13)$$

the other allowed process, is kinetically obstructed to low values of x. As a consequence, although "in bulk" conserved, $CaSiO_3$ is surface modified according to (13), which results in alteration of such characteristics as solubility rate, hydrolysis pH and notably, in formation of interfaces at micro-crystallite level with other component phases of the system. As a consequence, it was observed pursuant to the present invention, that multi-phase hybrid pigments produced accordingly, such as symbolized by:

$$[0.6Zn(MBT)_2/0.8Zn_3(PO_4)_2(H_2O)_2/ZnNCN+(0.3-0.4)CaSiO_3]$$

do not display tendency for segregation into component phases, in dispersed form.

Molybdates are conveniently incorporated into multi-phase hybrid pigments as Zn-, Ca- or Sr-molybdate, without by-products, according to $$2ZnO+Mo_2O_3\rightarrow 2ZnMoO_4 \quad (14)$$

$$2Sr(OH)_2+Mo_2O_3\rightarrow 2SrMoO_4+H_2O \quad (15)$$

$$CaSiO_3+xMo_2O_3\rightarrow(1-x)CaSiO_3/xCaMoO_4/xSiO_2 \quad (16)$$

where x<0.5.
Reactions 14 to 16 are preferably performed in situ, as variations of Reactions 8 and 9, where $Mo2O3$ addition follows MBT (or alternatives') introduction and it precedes or is concurrent with H3PO4 introduction. Note the similarity of Reactions 13 and 16.

Reaction 14 can be also performed "ex situ" followed by surface modification (particle encapsulation) which reduces the solubility of the resultant, relatively soluble product. The latter procedure is conveniently performed by precipitation of aluminum or zinc silicate or phosphate, as subsequently described, in situ in the ZnMoO4 aqueous suspension, which then is post-added into the product suspension of Reaction 9, or alternatives thereof.

As for borates, $Ca(BO_2)_2$ or $Sr(BO_2)_2$ are the preferred component phases, which can be produced in aqueous media according to:

$$B_4O_7(2-)+2M(2+)+H_2O\rightarrow 2M(BO_2)_2+2H(+) \quad (17)$$

where M=Ca or Sr.
Due to solubility of the products Reaction 17 is preferably realized ex situ followed by particle encapsulation and subsequent post-addition, performed identically to the above procedure regarding $ZnMoO_4$.

The typical phase composition of multi-component hybrid pigments, comprising, among others, molybdates and borates, can be represented by:

$$[0.2Zn(MBT)_2/ZnNCN/0.25Zn_3(PO_4)_2(H_2O)_4/0.2SrMoO_4+ 0.3Ca(BO_2)_2+0.5CaSiO_3]$$

Important to observe is that incorporation by post-addition of previously prepared dispersions of solids, or other essentially non-reactive solids into dispersions of multi-phase hybrid solids results in an ordinary mixture of the resultant solid phases.

Notably, alkyl-ammonium salts of mercapto derivatives, for example dicyclohexylammonium-2-mercaptobenzothiazolate, are also preferably incorporated into hybrid compositions as separately prepared aqueous suspensions. (See Example 10)

It was found beneficial, pursuant to the present invention, to apply specific particle encapsulation procedures in order to convert ordinary mixtures of finely divided multiple component phases into veritable microcomposites. The preferred procedure consists of gradual introduction, prior or subsequent to any performed synthesis reaction, of an aqueous zirconyl salt solution into an intensively stirred aqueous suspension of ordinary mixtures, and, if required, moderate heating and pH neutralization of the system. Any water soluble zirconyl salt is suitable, at a specific consumption equivalent to 1–3% $ZrO_2$ per total solids treated. Moderately acidic zirconyl acetate (pH=4) or alternatively, moderately basic ammonium zirconium carbonate (pH=9) or Na or K—zirconium carbonate, are however, preferred. Zirconyl acetate is available commercially at a typical assay of 20–22% ZrO2.

As for the mechanism, it is plausible that hydrated Zr hydroxide species nonselectively deposit and uniformly coat the surfaces of dispersed crystallites of the treated component phases. Subsequently dehydrated by drying, a typical operation in pigment manufacture, component phases develop common interfaces of $ZrO_2$, which results in characteristic "non-segregation" behavior displayed by organic-inorganic microcomposites. This "particle encapsulation" process can be presented as follows:

$$0.04Zr\text{-acetate}+0.1Zn(MBT)_2+CaSiO_3\text{ - - - }pH=7\rightarrow 0.1Zn(MBT)_2/ 0.04\text{ poly-}ZrO(OH)_2/CaSiO_3\text{-dehydrate}\rightarrow[0.1Zn(MBT)_2/CaSio_3]/0.04ZrO_2 \quad (18)$$

where [/] symbolizes a microcomposite state of the product. See Comparative Example 2.

An alternative particle encapsulation procedure employed, pursuant to the present invention, is based on precipitation of hydrated aluminum or zinc silicate, phosphate or pyro-phosphate in situ of aqueous dispersions of solids. The procedure is also applied preferentially to reduce the solubility of separately prepared, relatively soluble component phases of multiphase pigments such as $ZnMoO_4$ or $Ca(BO_2)_2$, as above indicated.

Practically, aqueous solutions of technical grade alkaline sodium silicate and acidic aluminum sulfate are gradually and concurrently introduced, at Al:SiO2=1:1.5 and adjusted to $NaOH:H_2SO_4=2:1$ molar ratios, in intensively stirred aqueous dispersions, at about 5–10% by weight of aluminum silicate per 100 g treated solids. The process is completed by extensive stirring, and, if applicable, by adjusting the pH of the dispersion to neutral. Although the effects of crystallite encapsulation (i.e., a microcomposite state) are generally preserved during typical manufacturing operations, such as filtration, drying and grinding, it was found, nevertheless, beneficial to surface treat Al-silicate encapsulated pigment dispersions by post-addition of polymeric dispersants, such as Solsperse 24000 (from Zeneca Resins). The organic treatment is applied at about 0.1–0.5% by weight total solids.

The alternative synthesis procedure for multi-component, organic-inorganic hybrid pigments, pursuant to the present invention, is based on coprecipitation by double decomposition of mixtures of soluble salts containing the above-specified selected anionic and cationic species. See Examples 7–11. Accordingly, soluble salts of selected organic thio-compounds are co-precipitated as Zn-derivatives, with phosphates, molybdates, phosphites, poly-phosphates and cyanamides of Zn, Al, Ca, Sr, Mg, Ti, Zr and Ce.

The application of the coprecipitation procedure is necessary in the case of thio-organic compounds which are unavailable in acid form, such as derivatives of dithio-carbonic and dithio-phosphoric acid. Formation of soluble byproducts, however, constitutes a severe limitation of the latter procedure, for it requires extensive washing of the synthesized pigments.

In order to minimize the inconvenience of byproduct formation, heterogenous processes such as represented by Reaction 19 are combined with coprecipitation, as follows:

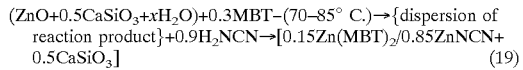

and,

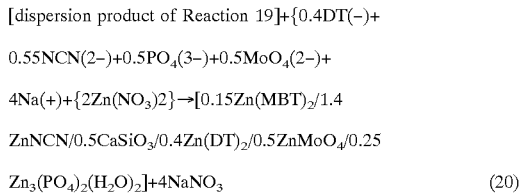

where DT symbolizes thio-organic compounds, such as O,O-di-alkyl-dithiophosphates, O-alkyl-dithiocarbonates, N-alkyl- (or N-aryl-)dithiocarbamates or mercaptans.

It was further discovered pursuant to this invention that a multi-phase inorganic system, which consists of ZnNCN, $Zn_3(PO_4)2H_2O$, ZnO, $CaSiO_3$ and notably, $SrCO_3$ component phases in specific molar ratios, displays a high degree of synergy as to corrosion inhibition. A detailed description of the multi-phase inorganic pigment's synthesis is disclosed in Example 18, infra. It will be observed that $SrCO_3$ and $CaSiO_3$ (see also Reaction 13) under the specified reaction conditions, are subject to surface modification according to:

and, respectively,

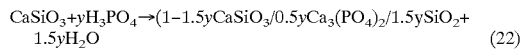

where x, y<<1.

Consistent with the subsequently presented analytical data, the multi-phase pigment grade product can be described as an ordinary mixture of finely divided three component phases: surface modified $SrCrO_3$ (Reaction 21), surface modified $CaSiO_3$ (Reaction 22) and the product of Reaction 11, the latter being a micro-composite, presumably consisting of 3 component phases.

The distinct chemical and phase composition of this preferred embodiment of the present invention can be symbolized by the theoretical formula:

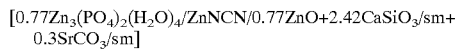

where "sm" indicates surface modification. It will be, however, apparent to those skilled in the art, that alternative versions of the multi-phase corrosion inhibitive pigment systems can be synthesized using different molar ratios of the component phases or by substituting $H_3PO_4$ for $H_3PO_3$, $H_4P_2O_7$ or various mixtures of the same, such as $H_3PO_4$+$H_3PO_3$.

The following examples disclose preferred procedures for reduction to practice of the present invention, with no intention however, to limit the applicability of the invention to the specific procedures.

These examples also demonstrate the feasibility of synthesis procedures according to the present invention, to produce various pigment grade inorganic and organic-inorganic hybrid corrosion inhibitors. The experimental evidence also demonstrates the same hybrid's synergistic behavior with respect to inhibition of corrosion on commercially significant metal substrates including iron, steel, silver, copper and aluminum. Other aspects of the invention also will be further illustrated by the following examples, wherein all percentages are given by weight unless otherwise indicated.

EXAMPLES

Experimental data presented under Comparative Example 1 are intended to demonstrate the above specified limitations of the concept and practice promoted by U.S. Pat. No. 4,329,381.

In comparative Example 2 experimental data are presented regarding the phase segregation tendency of finely divided multi-phase ordinary solid mixtures comparatively to "non-segregation" behavior of micro-composite organic-inorganic hybrids according to the present invention.

Comparative Example 1

Varieties of technical grade Zn-2-mercaptobenzothiazolate were produced pursuant to the recommendations of the above identified '381 patent, following procedures known in the art.

1.1. In order to obtain $Zn(MBT)_2$ by "direct conversion", a well dispersed and hydrated, highly reactive suspension of ZnO was prepared, by introducing 1.0 moles of such product (AZO 66 grade, with an average particle size of 0.25 micron, from American Smelting and Refining Co.) into 500 ml of intensively stirred hot water (80–85° C.) and keeping the same conditions for 1 hour.

Concurrently, aqueous suspension, containing 2.0 moles of finely ground MBT in 1000 ml water, (341.2 g. of 98%, available from Aldrich Chemical Co.) was prepared in similar fashion, using however a substantially small, but effective amount of non-ionic surfactant (Igepal-CA 630, distributed by Hydrite Chemical Co., Wis.). The "conversion" process was performed by the ZnO suspension's gradual introduction into the MBT suspension, 25 g of glacial acetic acid addition (as catalyst), and intense agitation of the reaction mixture at 98–100° C. for 2.5 hours. Subsequently, the solid phase of the resultant suspension was separated by filtration, dried at 105–110° C. overnight and pulverized to a fineness of 100% +270 mesh. Pertinent analytical data are presented in Comparative Table 1.

1.2. Technical grade $Zn(MBT)_2$ by "precipitation" was produced according to the following:

Aqueous solutions of 1.0 mol $ZnSO_4/1000$ ml at pH=4.0–4.3 and of 2.0 mol. Na-MBT/1000 ml were prepared, using high purity ZnO and technical grade MBT with 98% assay. Particularly, the latter solution was obtained by adding, in small increments, 341.2 g of MBT and 81.0 g NaOH into intensively stirred 800 ml of water at ambient temperature and subsequently completing the volume of the solution. Technical grade $Zn(MBT)_2$ was precipitated by introducing the above solutions, simultaneously at identical delivery rate (in about 30 min.), into well agitated 300 ml of water, at ambient temperature. After 1 hour of stirring at that temperature, the obtained slurry was filtered, washed intensively to salt-free conditions and further processed in identical fashion, as disclosed above. Related analytical data are presented below. Notably, the final product contained about 13% unreacted MBT.

1.3. Purified grade $Zn(MBT)_2$, free of unreacted MBT, was produced by double solvent extraction with acetone. For that purpose, of technical grade $Zn(MBT)_2$ (produced by precipitation according to 1.2) was used. Related analytical data are presented in Comparative Table 1.

COMPARATIVE TABLE 1

Quality parameters of $Zn(MBT)_2$ varieties

| Measured parameters | Comparative Example No. | | |
|---|---|---|---|
| | 1.1 | 1.2 | 1.3 |
| Zn % | 16.41 | 18.32 | 20.53 |
| MBT %, (unreacted) | 32.70 | 13.20 | ~0.00 |
| $Zn(MBT)_2$ %, (calculated) | 50.30 | 64.70 | 74.60 |
| Specific gravity | 01.67 | 1.71 | 1.60 |
| pH, (aqueous leachate) | 06.50 | 6.60 | 7.50 |
| Yield, g. | 412.00 | 418.00 | — |

IR spectra of $Zn(MBT)_2$ produced according to 1.1 are presented in FIG. 1.

1.4. Curing inhibition activity of technical grade $Zn(MBT)_2$ varieties, synthesized according to Comparative Examples 1.1–1.3 and of technical grade MBT, was evaluated by determining the minimum concentration in paint necessary to inhibit the curing process of a solvent-based medium alkyd paint formulation.

For that purpose, 3 mil thick applications of the of the paint formulations listed in Table 16.1 (Example 16) containing variable amounts of technical grade $Zn(MBT)_2$ of diverse quality (see Comparative Table 1) were applied on steel panels, subsequently dried at 70° C. for 30 minutes and evaluated for cure. Tack-free applications were considered cured. Data is presented in Table 1.4.

COMPARATIVE TABLE 1.4

| Tested $Zn(MBT)2$ or MBT, Comp. Eg. No. | Minimum wght % Inhibiting Cure | Observation |
|---|---|---|
| 1.1 | 0.25–0.5 | strong inhibition |
| 1.2 | 0.25–0.5 | " |
| 1.3 | >>10.0 | NO INHIBITION |
| MBT | 0.25–0.5 | strong inhibition |

As noted, all technical grade $Zn(MBT)_2$ varieties and MBT display cure inhibitive activity (attributed to their MBT content), at very low concentration ranges of 0.3–0.5 weight % in solvent-based alkyd paint. In comparison, $Zn(MBT)_2$ purified according to Comparative Example 1.3 does not inhibit cure even at >10.0 weight % concentrations.(See also Example 17)

Tested products display similar behavior in water reducible alkyd systems, at higher minimum inhibitive concentrations, however.

Comparative Example 2

The purpose of this Example is to produce an ordinary mixture of $Zn(MBT)_2$ and an inert inorganic product, (both finely divided) essentially according to the concept promoted by U.S. Pat. No. 4,329,381 and to demonstrate the tendency for component phase segregation of such system, by sedimentation in aqueous dispersion.

Comparative Example 2.1

25.0 g of finely ground technical grade $Zn(MBT)_2$ (highly hydrophobic, prepared according to Comparative Example 1.3, specific gravity=1.70) were initially converted into an aqueous paste by extended hand-grinding with a limited amount of water and a few drops of ethanol as wetting aid. The same was subsequently dispersed in 500 ml water at normal temperature with agitation. Concurrently, an aqueous dispersion of AlbaShield 50, a high purity wet ground muscovite mica (aluminum silicate & inert mineral filler pigment, commercially available from Aspect Minerals, Inc. with the following quality specifications: specific gravity= 2.8; +200 mesh>98%; +325 mesh>90%; in the form of fine flakes) was prepared by stirring 100.0 g of the former into 1000 ml water. Subsequently, an aqueous dispersion of the ordinary mixture, formed by the two finely divided solids, was prepared by mixing together the above described dispersions, under intense agitation and by completing the volume of the dispersion to 2000 ml. The phase composition of this ordinary mixture can be symbolized by the formula:

[20% $Zn(MBT)_2$+80% AlbaShield]

In order to quantify the segregation tendency of the ordinary mixture into component phases, the intensively stirred dispersion was quickly transferred into a 2000 ml graduated cylinder maintained in static condition for 15 minutes, for sedimentation, and subsequently separated in 3 equal volume dispersion samples (top fraction, middle fraction and bottom fraction of approximately 330 ml each) by vacuum suction. The solids (W total) of each sample were separated by filtration, dried at 110° C., weight W(tot.) and analyzed for $Zn(MBT)_2$ contents W(ZnMBT).

Conveniently, the solid samples' $Zn(MBT)_2$ contents were determined by selective solubilization of the latter in aqueous NaOH solution; it was experimentally confirmed, that AlbaShield 50 is not soluble in the same solution. Each solid sample was re-dispersed in approximately 300 ml NaOH 10% solution, stirred for 30 minutes, filtered, well washed and dried to constant weight, which represented the pertinent AlbaShield content, whereas the observed weight loss represented the solid samples' $Zn(MBT)_2$ content.

In order to quantify the extent of segregation of the ordinary mixture into its component phases (which occurred during the allowed sedimentation time), the Segregation Index (% Iseg.), was determined according to the following formula:

% Iseg.=100(% ZnMBT−20)/20 where % ZnMBT=W(ZnMBT)/W(tot.) is the solid samples' $Zn(MBT)_2$ content in weight %.

By design, the ordinary mixture's % ZnMBT=20%, and, consequently, positive or negative values of % Isg. indicate segregation (relative accumulation or depletion of $Zn(MBT)_2$ in the fractions of the respective dispersion samples. % Isg.=0 indicates no segregation. Experimental data and results are presented in Comparative Table 2.

Comparative Example 2.2

The objective of this experimental work was to demonstrate that a prior art ordinary mixture of $Zn(MBT)_2$ and an inert inorganic product, both finely divided, if converted into micro-composite (organic-inorganic hybrid) by particle encapsulation,(one of the applicable techniques of the present invention) does not display a tendency for phase segregation.

For that purpose, organic-inorganic hybrid micro-composite of identical phase composition to that of Comparative Example 2.1, was produced by precipitating $Zn(MBT)_2$, the organic component phase, "in situ" in an aqueous dispersion of finely ground inorganic AlbaShield 50 and by particle encapsulation. 25 g. (0.065 moles) of $Zn(MBT)_2$ were synthesized by double decomposition, according to Comparative Example 1.2 in situ of 100 g. intensely stirred, previously prepared, AlbaShield 50 in 500 ml water which also contained 13 g. Of zirconyl acetate solution for particle encapsulation. (See Example 1.2) The synthesis was finalized by further intensively stirring for about 30 minutes, subsequent volume adjustment to 2000 ml and pH correction to pH=7.

The dispersion was filtered, washed, dried, and pulverized in a mechanical lab pulverizer to 100% +270 mesh in accord with conventional pigment manufacturing procedures.

The phase composition of the resultant hybrid microcomposite can be symbolized by

[20% $Zn(MBT)_2$+80% AlbaShield]/2% $ZrO_2$

To assess micro-composite characteristics of the resultant organic-inorganic hybrid, the pulverized product was dispersed in 2000 ml water by intense agitation and its tendency for phase segregation during sedimentation was quantified in accordance with the procedure of Comparative Example 2.1. Pertinent data and results are presented below in Comparative Table 2.

COMPARATIVE TABLE 2

|  | Ordinary mixture of Comparative Example 2.1. | | | | Hybrid composite of Comparative Example 2.2. | | | |
| --- | --- | --- | --- | --- | --- | --- | --- | --- |
| Sample | W(Tot.) | W(ZnMBT) | %ZnMBT | %Iseg. | W(Tot.) | W(ZnMBT) | %MBT | %Iseg. |
| Top fraction | 11.2 g | 6.0 | 54.0% | +170% | 32.0 g | 6.8 g | 21.2% | +6% |
| Middle fraction | 28.4 g | 3.0 g | 10.6% | 47% | 45.3 g | 8.6 g | 18.9% | −5.5% |
| Bottom fraction | 83.9 g | 15.3 g | 18.2% | −9% | 52.3 g | 10.2 g | 19.6% | −2% |

These experimental results are interpreted comparatively and show that the ordinary mixture of Comparative Example 2.1 displayed a significant degree of segregation into component phases, while in contrast, the product of Comparative Example 2.2 did not.

Examples of Embodiments of the Present Invention

All of the following examples disclose manufacturing procedures and pertinent chemical compositions of pigment grade organic-inorganic hybrid compounds obtainable pursuant to the present invention. Experimental data regarding applicability thereof in alkyd based paint systems, as well as regarding their synergistic behavior with respect to corrosion inhibition, are also presented.

Example 1

Pigment grade, organic-inorganic hybrids, characterized by synergistic corrosion inhibition with respect to Ag, Cu, Al, Fe and symbolized by phase-composition formulas:

[0.05$Zn(MBT)_2$/ZnNCN], 1.1:

and

[0.05$Zn(MBT)_2$/ZnNCN+0.5$CaSio_3$]/0.03$ZrO_2$    1.2:

were produced according to Reactions 3 and 4 and the following procedure:

To synthesize 1.1, highly reactive, hydrated and finely divided Zno suspension was prepared by introducing 1.0 mole of ZnO (AZO 66 grade, characterized by 0.25 micron average particle size, assay: >99.9%, from American Smelting and Refining Co.) into 500 ml of hot water, with intensive agitation. The dispersion and hydration process was completed by maintaining the same conditions (85–90° C.) for one additional hour.

Concurrently, aqueous suspension of MBT, (technical grade 98% 2-Mercaptobenzothiazole, available from Aldrich Chemical Co.) was obtained in similar fashion, containing 0.1 moles (17.0 g. of 98%) of the same in 200 ml of water at ambient temperature, using, however, a small but effective amount of non-ionic surfactant (Igepal-CA 630, distributed by Hydrite Chemical Co., Wis.)as a wetting aid.

By introducing the latter suspension into the former, a mixed suspension was formed and converted, at 85–90° C. and intense agitation for 2.5 hours, into a Zn(MBT)$_2$/ZnO suspension. Subsequently, a pigment grade hybrid, according to the above noted phase-composition, was produced by introducing in about 30 min. into the reaction mixture, 1.05 moles of H$_2$NCN (as aqueous solution of 50 weight %, available from S.K.W., Germany) and keeping the same conditions (80–85° C., intense agitation) for one hour. The resultant product suspension's solid phase was separated by filtration. The presscake, without washing, was dried at 105–110° C. for 12 hours and pulverized to a fineness of 100% +270 mesh.

Organic-inorganic hybrid pigment 1.2 was synthesized, in identical fashion as disclosed for Example 1.1, except that a mixed suspension of 1.0 moles (81.38 g) ZnO and 0.5 moles (58.0 g) Wollastonite grade CaSiO$_3$ (NYAD 1250 grade Wollastonite from NYCO Minerals) in 1000 ml of water was processed.

Notably however, for particle encapsulation purposes 20 g of aqueous zirconyl acetate solution (assay: 20% ZrO$_2$, from Magnesium Electron, Inc.) was gradually post-added into the intensively stirred suspension of the final product and the same conditions were extended for 30 minutes.

Figure 2:
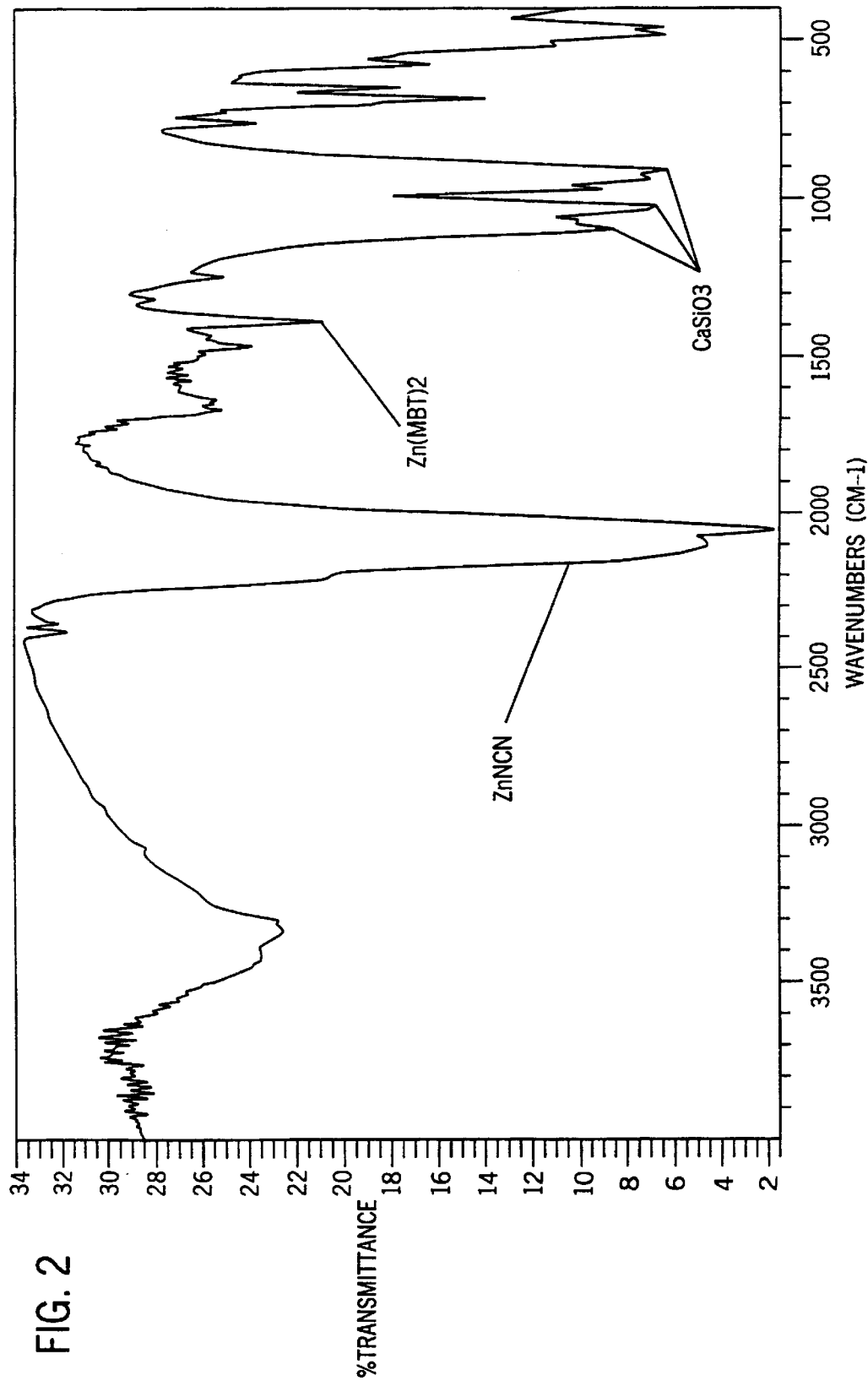

Pertinent analytical data and IR spectrum characteristic to 1.2 are presented in Table 1. and FIG. 2, respectively.

TABLE 1

| Measured Parameters | Determined Values | |
|---|---|---|
| | 1.1. | 1.2. |
| Appearance | white powder | |
| Zn total, % | 55.60 | 32.8 |
| NCN % | 29.88 | 19.1 |
| pH (ASTM D-1208-81/6.1.1) | 8.3 | 8.7 |
| Specific Gravity | 2.74 | 2.7 |
| Oil absorption, lbs/100 lbs; (ASTM D-281-84) | 34 | 32 |
| Yield, g. | 114.3 | 185.5 |

Example 2

A pigment grade hybrid of [0.25Zn(MBT)$_2$/ZnNCN] composition was synthesized according to Reaction 7 and the following procedure:

Aqueous ZnO slurry, containing 1.0 moles in 500 ml H$_2$O, was prepared as describe in Example 1.1. Keeping the reaction conditions the same for an additional hour, ZnO suspension was converted into ZnNCN suspension (procedure according to my U.S. Pat. No. 5,176,894), by introducing into it in about 15 min, 1.1 moles (46.5 g) of H$_2$NCN as aqueous solution of 50% by weight.

Without solid-liquid separation, the ZnNCN suspension was subsequently converted into pigment grade hybrid suspension by introduction of aqueous suspension containing 0.2 moles (34.0 g) of finely ground MBT/400 ml H$_2$O. See details in Example 1. Pertinent analytical data are as follows:

TABLE 2

| Measured quality parameters | Determined values |
|---|---|
| Zn total % | 47.8 |
| NCN % | 22.6 |
| pH | — |
| Oil absorption, lbs/100 lbs | — |

TABLE 2-continued

| Measured quality parameters | Determined values |
|---|---|
| Spec. gravity | — |
| MBT (IR, extraction) | practically absent |
| Yield, g. | 135.0 |

Example 3

A pigment grade, multi-phase organic-inorganic hybrid corrosion inhibitor symbolized by:

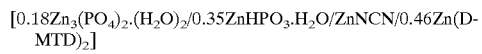

was produced according to the following procedure: The following precursors were initially prepare: Dispersion (A): 5.65 moles ZnO/3500 ml hot water (See Example 1); Solution (B): 0.87 moles H$_3$PO$_4$+0.83 moles H$_3$PO$_3$/1000 ml H$_2$O; Solution (C): 2.6 moles of H$_2$NCN/1000 ml H$_2$O; Suspension (D): 2.2 moles of finely ground technical grade DMTD (from R.T.Vanderbilt Company, Inc.)/1500 ml H$_2$O.

The synthesis was carried out at 60–65° C. with intense agitation by gradual introduction of (B) and, after 30 minutes, of © into (A). Subsequently, after keeping the same reaction conditions for one hour, (D) was gradually added to the reaction suspension. The synthesis was finished by maintaining the same conditions for two additional hours, after which the resultant product was further processed (without washing) as described in Example 1. Pertinent analytical data are given in Table 3.

TABLE 3

| Measured quality parameters | Determined values |
|---|---|
| Appearance | yellowish powder |
| Zn total, % | 36.2 |
| NCN % | — |
| pH (ASTM D-1208-81/6.1.1.) | 6.0 |
| Specific gravity | 2.27 |
| Oil absorption, lbs/100 lbs; (ASTM D-281-84) | 32 |
| Yield, g | 1009.0 |

Example 4

Pigment grade, organic-inorganic hybrid corrosion inhibitor, symbolized by

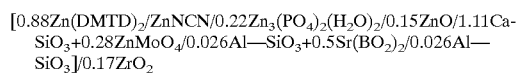

theoretical formula, was synthesized following a combined procedure based on Reactions 10–12, 14, 17 and encapsulated according to 18. Notably, ZnMoO$_4$ and Sr(BO$_2$)$_2$ prepared in accordance with reactions 14 and 17, were selectively subsequently encapsulated with Al-silicate, Al—SiO$_3$. The following precursors were initially prepared:

Dispersion (A): 2.1 moles ZnO+100 g (0.86 moles) CaSiO$_3$/500 ml H$_2$O (see applicable section of Example 1);

Dispersion (B): 1.37 moles DMTD/300 ml H$_2$O, by intense agitation at normal temperature;

Solution (C): 0.35 moles H$_3$PO$_4$/100 ml H$_2$O;

Solution (D): 0.77 moles H$_2$NCN/200 ml H$_2$O;

Solution (E): 82.0 g zirconyl acetate solution (see Example 1).

Dispersion (F): containing 0.22 moles of [$ZnMoO_4$/0.09 $Al_2O_3(SiO_2)_3$] in 150 ml $H_2O$, was prepared at 80–85° C., by intense agitation of an aqueous mixed dispersion of finely divided 0.22 moles ZnO+0.22 moles $MoO_3$, for about 60 minutes. The resultant product, without separation and keeping the same conditions, was subsequently particle-encapsulated by introducing, first, 15.2 g $NaSiO_3$ solution (assay: 30% $SiO_2$) into the dispersion, followed by gradual addition of 27.0 g $Al(NO_3)_3$ solution (assay: 4.2% Al) and by pH adjustment to pH=7.

Dispersion (G): containing 0.39 moles of [$Sr(BO_2)_2$/0.05 $Al_2O_3(SiO_2)_3$] in 150 ml $H_2O$, was prepared by double decomposition of 0.39 moles $Sr(NO_3)_2$ and 0.19 moles of $Na_2B_4O_7.10H_2O$, technical grades. The resultant product was particle encapsulated in identical fashion as above described.

Emulsion (H): containing 1.2 g Solsperse 24000/10 ml $H_2O$ (polymeric dispersant from Zeneca Resins) was prepared according to ordinary procedures known to the art.

Pigment grade hybrid corrosion inhibitor was produced by gradual delivery of © followed by (D), into the intensively stirred (A) at 70–85° C. After 30 minutes, (B) was gradually added and the above specified conditions were kept for 2 hours. Subsequently, (F) and concurrently (G), then (E) was slowly introduced, the pH was adjusted to pH=7 and finally (H) was added to the reaction medium. While keeping the same conditions, the process was finalized in 30 minutes, after which the resultant product was separated by filtration, washed to salt-free conditions and further handled in identical fashion as described in Example 1.

Figure 3:
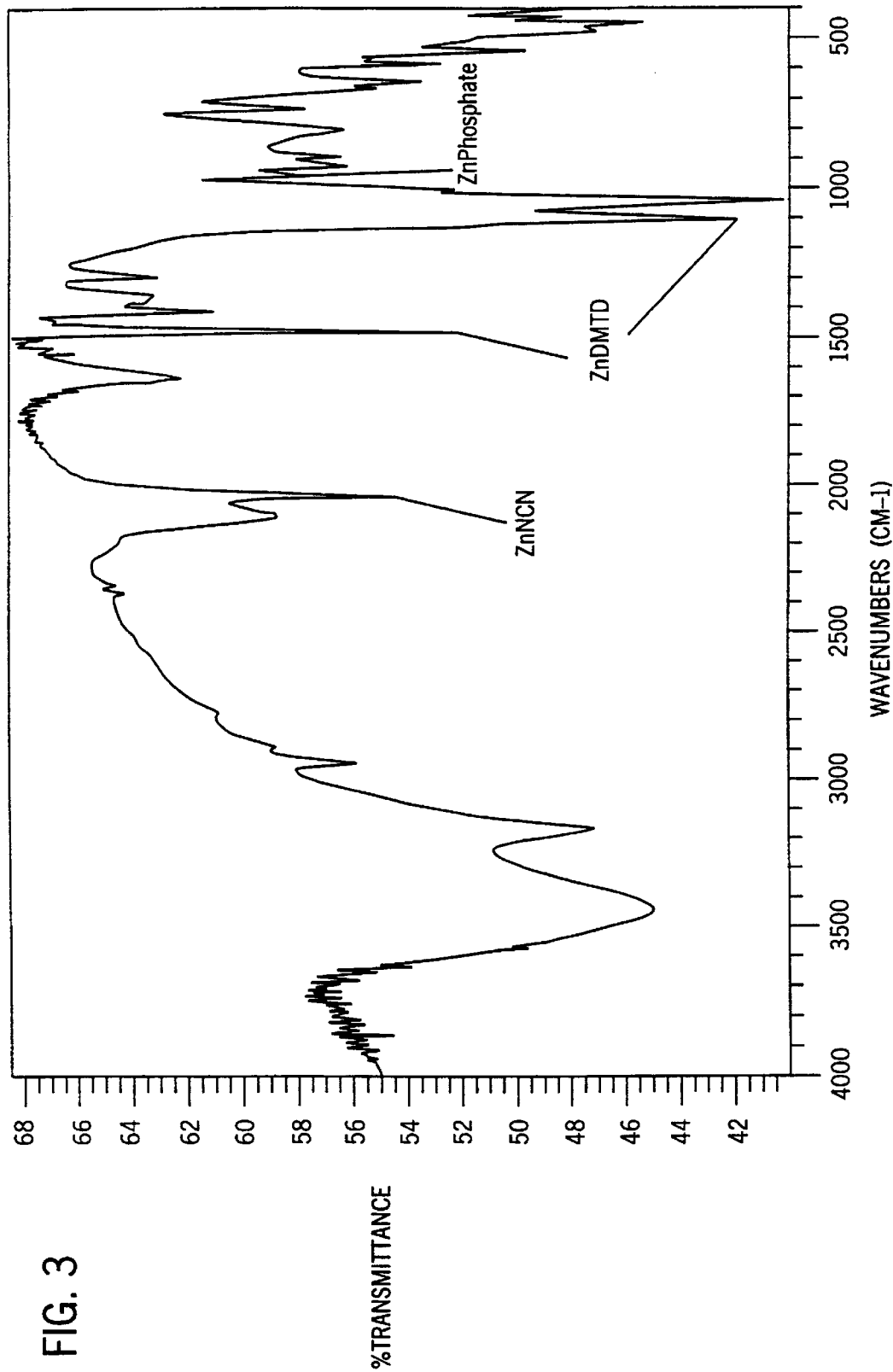

Pertinent analytical data and IR spectrum are presented below and FIG. 3, respectively.

TABLE 4

| Measured quality parameters | Determined values |
| --- | --- |
| Appearance | yellowish powder |
| Zn total, % | 36.2 |
| NCN, % | 1.1 |
| pH (ASTM D-1208-81/6.1.1) | 7.1 |
| Specific gravity | 2.55 |
| Oil absorption, lbs/100 lbs; (ASTM D-281-84) | 44 |
| Yield, g | 622 |

Example 5

A pigment grade organic-inorganic hybrid corrosion inhibitor symbolized by:

[$0.06Zn(MBT)_2/0.06Zn(MTH)_2/ZnNCN/0.21Zn_3(PO_4)_2(H_2O)_2$]

where $Zn(MTH)_2$ represents Zn-2-mercaptothiazoline, was synthesized according to a combined procedure. See Reactions 19 and 20.

For that purpose, the following were initially prepared:

Dispersion (A): 1.7 moles ZnO/1000 ml.$H_2O$; (see applicable section of Example 1)

Solution (B): 1.8 moles $H_2NCN$/500 ml.$H_2O$;

Solution (C): 2.4 moles $ZnSO_4$/1500 ml.$H_2O$ at approximate pH=4.0;

Solution (D): 0.3 moles of MBT (36.5 g. of 98%), 0.3 moles of MTH (51.2 g. of 98%), and 1.0 moles of $H_3PO_4$ were dissolved in 1000 ml. aqueous solution of 4.8 moles NaOH. After cooling it to ambient temperature, 0.6 moles of $H_2NCN$ were added and the volume completed to 1500 ml.

Pigment grade hybrid was produced by introducing first, in about 30 min., Solution (B) and then, simultaneously, in about 30 min., Solutions © and (D) into intensively stirred Dispersion (A). The process was finalized by stirring at 60–65° C. for one hour, when of the reaction medium was pH=7–8, after which the suspension's solid phase was separated by filtration, washed to soluble salt-free conditions and further processed in identical fashion as disclosed in the applicable section of Example 1.

Pertinent analytical data are presented in Table 5.

TABLE 5

| Measured parameter | Determined value |
| --- | --- |
| Zn total % | 46.7 |
| NCN % | 13.6 |
| pH | 8.4 |
| Oil absorption, lbs/100 lbs | — |
| Spec. gravity | 2.63 |
| Yield, g. | 550.0 |

Example 6

Pigment grade, organic-inorganic hybrid, symbolized by:

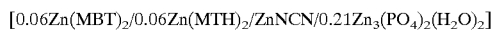
[$0.075Zn(DMTD)_2/ZnNCN$]

where $Zn(DMTD)_2$ is Zn-2,5-dimercapto-1,3,4-thiadiazolate, was produced according to the following procedure:

The following were initially prepared:

Dispersion (A): 2.0 moles ZnO/1000 ml. $H_2O$; (see Example 1)

Solution (B): 2.1 moles $H_2NCN$/500 ml. $H_2O$;

Solution (C): 0.15 moles $ZnSO_4$/200 ml. $H_2O$ at pH⁻4.0;

Solution (D): 0.15 moles of $Na_2DMTD$/200 ml. $H_2O$, by solubilization of DMTD (technical grade, from Aldrich Chemical Co.) in NaOH solution.

The synthesis was carried out by simultaneous introduction, in about 30 min., of (B), © and (D) into intensively stirred (A) at 50–60° C. and by pH adjustment to pH=8.0. After maintaining these conditions for one hour, the pigment suspension was processed as described in Example 5.

Figure 4:
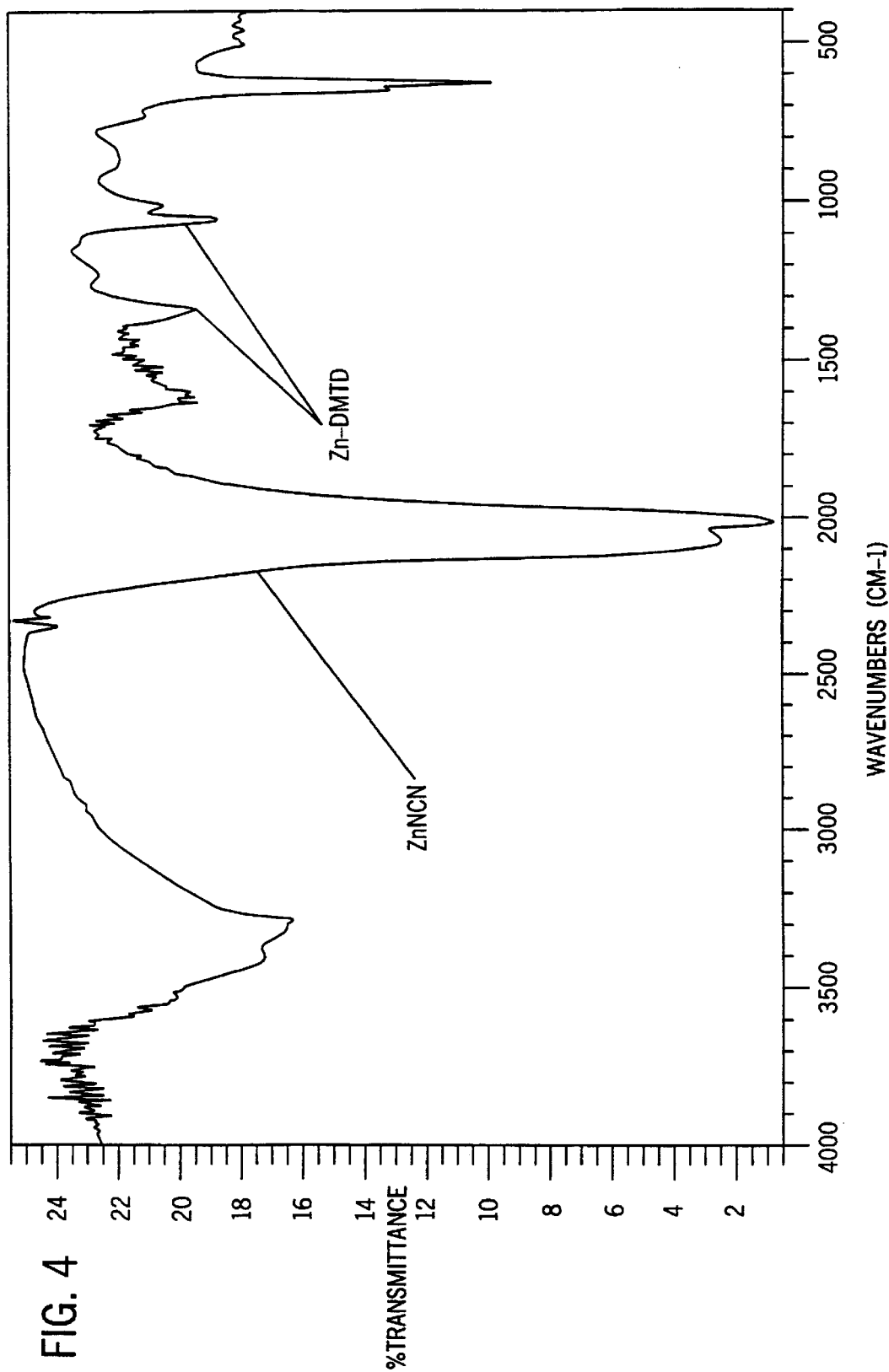

Related analytical data, IR spectra are presented below and in FIG. 4, respectively.

TABLE 6

| Measured parameter | Determined value |
| --- | --- |
| Appearance | white powder |
| Zn total, % | 57.4 |
| NCN % | 26.6 |
| pH | 8.11 |
| Sp. gravity | 2.94 |
| Oil absorption, lbs/100 lbs | — |
| Yield, g. | 235.0 |

Example 7

Pigment grade, organic-inorganic hybrid corrosion inhibitors symbolized:

[0.05Zn(MBI)$_2$/ZnNCN+0.5CaSiO$_3$]/0.03ZrO$_2$   7.1

[0.05Zn(MTH)$_2$/ZnNCN+0.5CaSiO$_3$]/0.03ZrO$_2$   7.2

[0.05Zn(CyM)$_2$/ZnNCN+0.5CaSiO$_3$]/0.03ZrO$_2$   7.3 where Zn(MBI)$_2$, Zn(MTH)$_2$ and Zn(CyM)$_2$ stand for zinc-2-mercaptobenzimidazolate, zinc-2-mercaptothiazolinate and Zn(—S—(C$_6$H11)$_2$ or (Zn-cyclohexyl-thiolate), respectively, were synthesized.
For that purpose, the following, were initially prepared:

Suspension (A): 165.0 g.CaSiO3+224.0 g.(2.75 moles) of ZnO/2500 ml.H$_2$O, according to Example 1.

Solution (B): 50 g. aqueous zirconyl acetate solution (assay: 20% ZrO2 from Magnesium Electron,Inc.);

Solution (C): 0.15 moles Zn(NO3)2/300 ml.;

Solution (D1), (D2) and (D3), containing, respectively: 0.3 moles of Na-MBI/300 ml.H$_2$O, or 0.3 moles of Na-MTH/300 ml. H$_2$O, or in the case of (D3), 0.28 moles of Na-CyM/300 ml. H$_2$O, were prepared by solubilizing corresponding amounts of technical grade MBI or MTH (both available from Aldrich Chemicals Co.) or technical grade cyclohexyl mercaptan (from ELF Atochem North America, Inc.), respectively, in equivalent amounts of NaOH solutions.

Solution (E): 3.0 moles H$_2$NCN/500 ml. H$_2$O.

Figure 5:
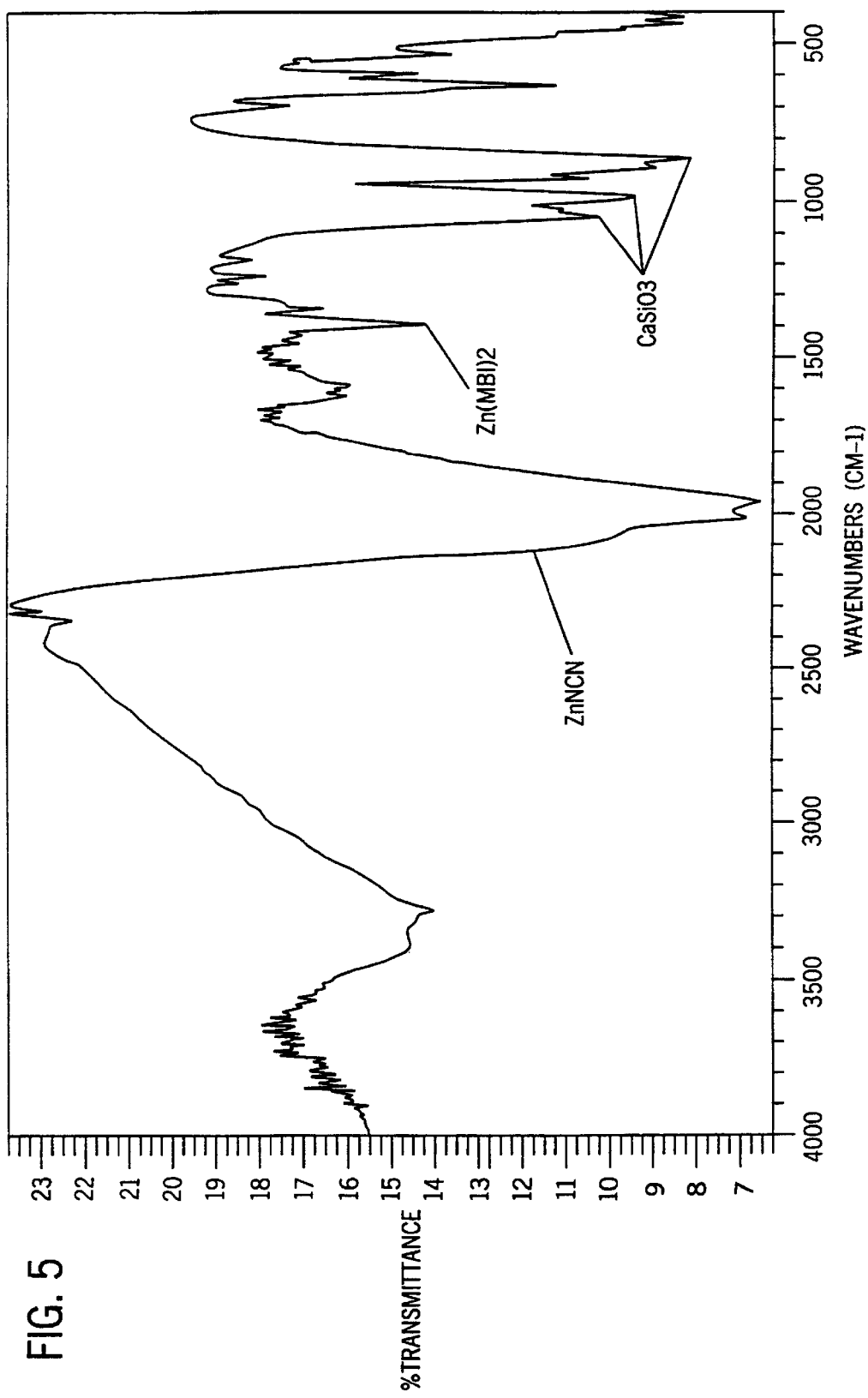

Hybrid pigment varieties 7.1., 7.2. and 7.3 were produced in essentially identical fashion. First(B) was introduced, in about 15 min. with intense agitation, into (A) at 65–85° C. Subsequently (C) and (D1) or, alternatively, for 7.2, (C) and (D2), or, in the case of 7.3, (C) and (D3) were introduced simultaneously, in about 15 min., into the reaction medium. Finally, after one hour of intense agitation at 65–75° C. of the reaction medium. In each case (E) was introduced in about 30 min. and the same conditions were extended for one additional hour. The process was completed and the obtained pigments were further processed in identical fashion as set forth in Example 5 except that the products' slurries were cooled to ambient temperature before performing solid-liquid separation. All operations involving cyclohexyl mercaptan were performed in closed apparatus equipped with a caustic scrubber. Analytical data and IR spectra pertinent to 7.1 are presented below and FIG. 5, respectively.

TABLE 7

| Measured quality parameters | Determined values | | |
|---|---|---|---|
| | 7.1. | 7.2. | 7.3. |
| Appearance | White powder | White powder | White powder |
| Zn total, % | 37.0 | 42.8 | 37.0 |
| NCN, % | 18.63 | 16.29 | 40.1 |
| pH | 8.1 | 8.3 | 2.5 |
| Specific gravity | 2.78 | 3.00 | 8.4 |
| Oil absorption, lbs/100 lbs | 36 | — | — |
| Yield, g. | 515.0 | 490.0 | 495.0 |

Example 8

Pigment grade hybrid corrosion inhibitor symbolized by

[0.13Zn(CyDC)$_2$/ZnNCN/0.21Zn$_3$(PO$_4$)$_2$2(H$_2$O)$_2$]

where Zn(CyDC)$_2$ stands for Zn—(—S(S)—NH—C$_6$H$_{11}$)$_2$, or Zn-cyclohexyl-dithiocarbamate, was produced in identical fashion as described in Example 5, except that solution (D), in this case contained 1.0 moles of Na$_3$PO$_4$ and 0.6 moles each of Na$_2$NCN and Na-cyclohexyl-dithiocarbamate. The latter was synthesized pursuant to known procedure, as follows: 0.65 moles of CS$_2$ were slowly introduced, at normal temperature, into a solution comprising 0.6 moles of cyclohexylamine and 0.6 moles of NaOH in 400 ml water.

Figure 6:
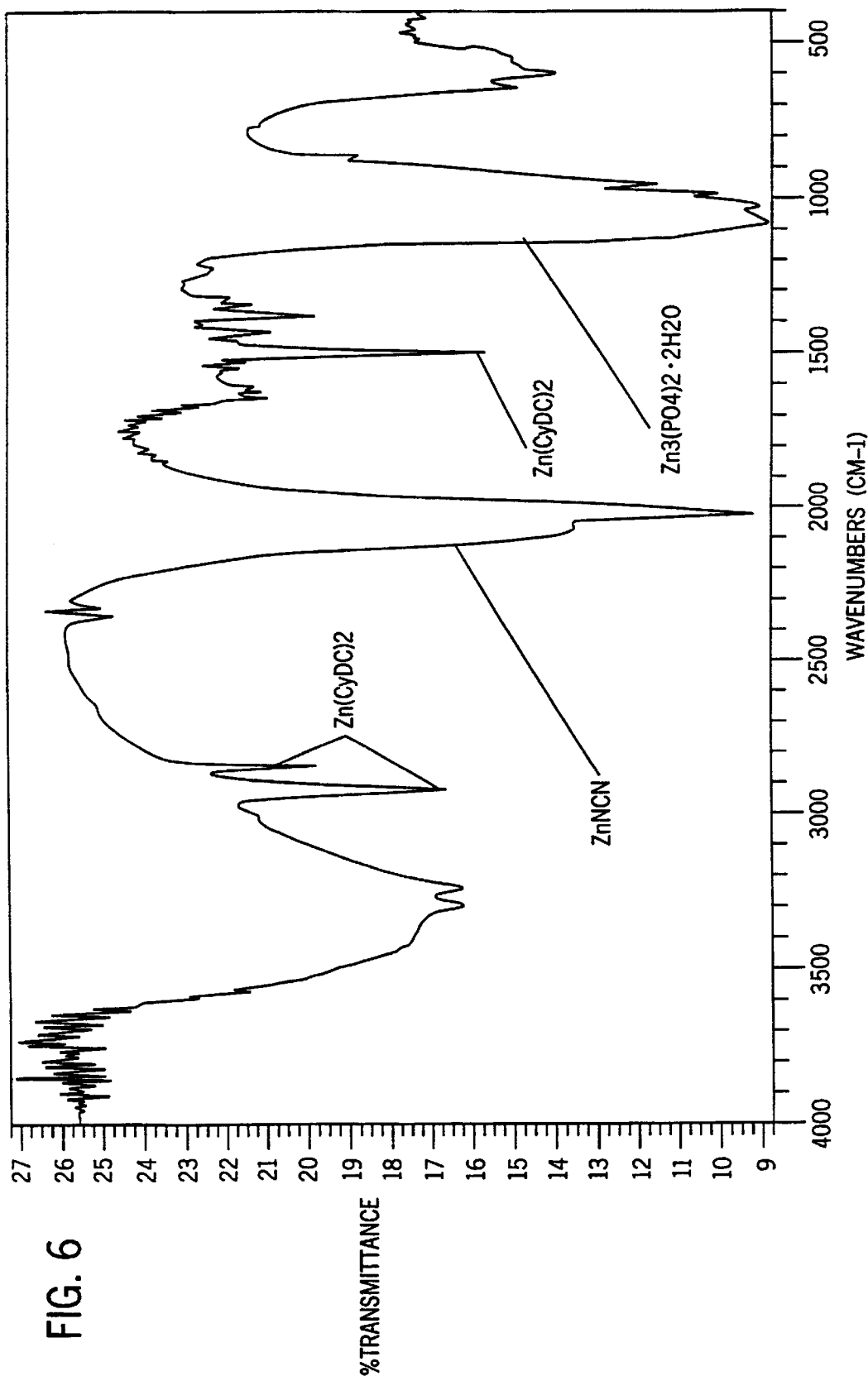

Pertinent analytical data and IR spectrum are presented below and FIG. 6, respectively.

TABLE 8

| Measured parameter | Determined value |
|---|---|
| Appearance | pale yellow |
| Zn total, % | 49.0 |
| NCN, % | 14.2 |
| pH | 7.7 |
| Oil absorption, lbs/100 lbs | — |
| Spec. gravity | 2.62 |
| Yield, g. | 548.0 |

Example 9

Pigment grade organic-inorganic hybrid corrosion inhibitor symbolized by

[0.06Zn(n-pDC)$_2$/ZnNCN/0.21SrMoO$_4$/0.1Zn$_3$(PO$_4$)$_2$2H$_2$O]

where Zn(n-pDC)$_2$ is Zn(—S(S)C—O—C$_3$H$_7$—O-n)$_2$, or zinc-n-propyl-O-dithiocarbonate, was synthesized in identical fashion as described in Example 5, except that Solution (C), in this case, contained 0.5 moles Sr(NO$_3$)$_2$+1.65 moles Zn(NO$_3$)$_2$/1500 ml H$_2$O and Solution (D) contained 0.5 moles Na$_3$PO$_4$, 0.5 moles Na$_2$MoO$_4$, 0.6 moles Na$_2$NCN and 0.6 moles Na—S(S)C—O—C$_3$H$_7$-n/1500 ml H$_2$O.

Na-n-propyl-dithiocarbonate was synthesized pursuant to known procedure, as follows: into a mixture of 0.61 moles n-propanol and 0.6 moles NaOH/100 ml H$_2$O, 0.61 moles of CS$_2$ were gradually introduced under moderate agitation and at 40–50° C., after which the same conditions were kept for one hour. The obtained solution was subsequently incorporated into solution (D). Results are shown in Table 9.

TABLE 9

| Measured parameter | Determined value |
|---|---|
| Appearance | white powder |
| Zn total, % | 41.08 |
| NCN, % | 12.3 |
| pH | 7.3 |
| Oil absorption, lbs/100 lbs | — |
| Spec. gravity | 2.84 |
| Yield, g. | 525.0 |

Example 10

A multi-phase pigment grade hybrid corrosion inhibitor for Ag, Cu, Al, Fe, represented by:

[0.05dCy-MBT/ZnNCN+0.5CaSiO$_3$]/0.03ZrO$_2$ (where dCy-MBT is di-cyclohexylammonium 2-mercaptobenzothiazolate) was produced. The following were initially prepared:

Suspension (A): 2.75 moles ZnO+165.0 g. CaSiO3/2000 H$_2$O (see Example 1)

Suspension (B): 0.15 moles of dCy-MBT/500 ml.H$_2$O was produced by simultaneous introduction of 0.15 moles Na-MBT/150 ml.H₂O and 0.15 moles of di-cyclohexylammonium sulfate/150 ml.H₂O, into 200 ml.H₂O intensively stirred at normal temperature.

Solution (C): 3.0 moles H2NCN/500 ml.H₂O;

Solution (D): 50 g ammonium zirconium carbonate solution (assay: 22% ZrO₂ from Magnesium Electron, Inc.)

Pigment grade hybrid was synthesized by simultaneous introduction, in about 30 minutes, of (B) and (C) into (A), intensively stirred at 65–75° C. After subsequent addition of (D) and keeping the same conditions for one hour, the pigment slurry was cooled to normal temperature and processed as described in Example 5.

Figure 7:
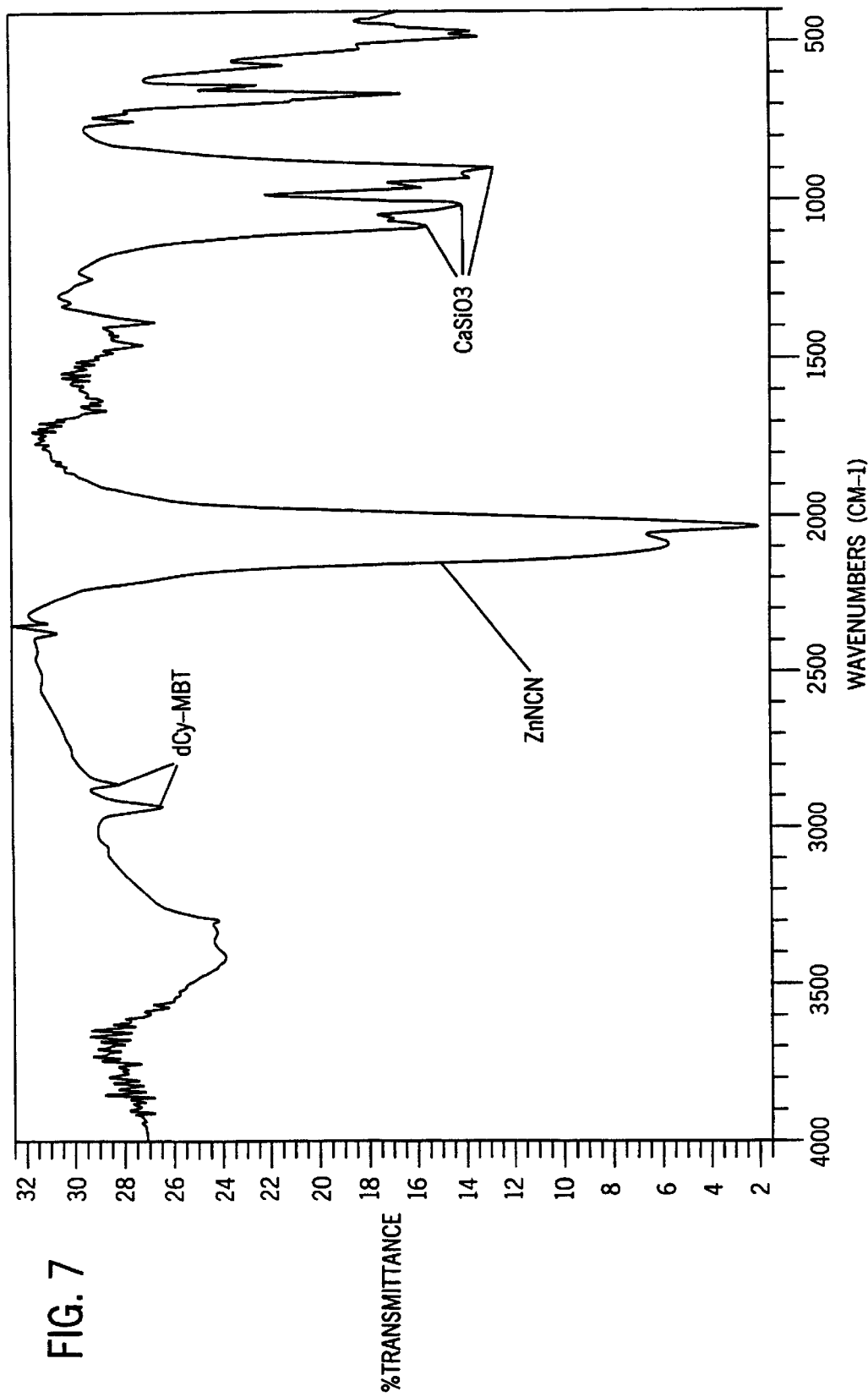

Pertinent analytical data and characteristic IR Spectrum are presented in Table 10 and FIG. 7, respectively.

TABLE 10

| Parameter measured | Determined value |
| --- | --- |
| Appearance | white powder |
| Zn total, % | 38.9 |
| NCN, % | 35.1 |
| pH | 8.9 |
| Specific gravity | 2.72 |
| Oil absorption, lbs/100 lbs | — |
| Yield, g. | 501.0 |

Example 11

Organic-inorganic hybrid corrosion inhibitor, corresponding to:

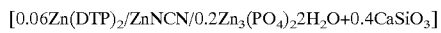

[0.06Zn(DTP)₂/ZnNCN/0.2Zn₃(PO₄)₂2H₂O+0.4CaSiO₃]

where $Zn(DTP)_2$ symbolizes $Zn-(S(S)P[-OCH_2-CH(CH_3)CH_3]_2$ or $Zn-O,O-di-(I-butyl-dithiophosphate)$, was synthesized. For that purpose, the following were initially prepared:

Dispersion (A): 138.5 g.(1.7 moles) ZnO+116.5 g. (1.0 moles) CaSiO3/1000 ml.H₂O; (see Example 1)

Solution (B): 1.8 moles H₂NCN/500 ml.H₂O;

Solution (C): 2.25 moles ZnSO₄/1500 ml.H₂O at approximate pH=4.0;

Solution (D): 1.0 mole Na₃PO₄+0.6 moles Na₂NCN/1000 ml.H₂O;

Solution (E): 0.3 moles of NH₄-DTP/500 ml.H₂O);

NH₄-DTP was synthesized following known procedures. The synthesis of pigment grade hybrid was carried out in identical fashion as described in Example 5. Analytical data are presented in Table 11.

TABLE 11

| Measured parameter | Determined value |
| --- | --- |
| Appearance | white powder |
| Zn total, % | 50.05 |
| NCN, % | 10.7 |
| pH | 8.2 |
| Oil absorption, lbs/100 lbs | — |
| Spec. gravity | 3.23 |
| Yield, g. | 630.0 |

Example 12

Pigment grade hybrid composites synthesized according to Examples 1.2 and 6 were tested comparatively to a strontium chromate control, as pigment components of protective primer formulations, specifically for their inhibitive activity to metal corrosion.

Two such solvent based epoxy/polyamide (two component) test formulations (identified as 12.1 and 12.2) and corresponding control formulations, were applied and tested on aluminum and copper substrates. Details are presented below in Table 12.

TABLE 12

| Components of Formulations 12.1 & 12.2 | Trade Names & Suppliers of Components | Parts by Weight | | | |
| --- | --- | --- | --- | --- | --- |
| | | 12.1 | | 12.2 | |
| | | Test | Control | Test | Control |
| Epoxy Base | | | | | |
| Epoxy Resin | Shell Epon 1001 CX75 | 320.0 | same as test | 320.0 | same as test |
| Solvents | Xylene | 50.0 | same as test | 50.0 | same as test |
| | Toluene | 103.0 | same as test | 103.0 | same as test |
| | *PM Acetate | 40.0 | same as test | 40.0 | same as test |
| | MIBK | 40.0 | same as test | 40.0 | same as test |
| | MEK | 60.0 | same as test | 60.0 | same as test |
| | Butanol | 20.0 | same as test | 20.0 | same as test |
| Fillers | R-900 TiO2 | 75.0 | same as test | 75.0 | same as test |
| | Blanc Fixe Micro | 100.0 | same as test | 100.0 | same as test |
| | 399 Talc | 155.0 | 200.0 | 100.0 | 200.0 |
| | Omyra Carb F (1) | — | — | 55.0 | " |
| Additives | Aerosil R-972 (2) | 2.0 | " | 2.0 | " |
| | Beetle 216-8 (3) | 15.0 | " | 15.0 | " |
| Corrosion Inhibitor Pigments | | | | | |
| Zn(MBT)₂/ZnNCN/ CaSiO₃ | See Example 1.2 | 95.0 | — | — | — |
| Zn-DMTD/ZnNCN | See Example 6 | — | — | 95.0 | — |
| Strontium Chromate Catalyst | SrCrO4-176 (4) | — | 50.0 | — | 50.0 |
| Hardener | Aramide 220 Polyamide | 160.0 | " | — | — |
| | Shell 3115-X-70 Polyamide | — | — | 160.0 | " |
| Solvents | Toluene | 168.0 | " | 168.0 | " |
| | MIBK | 222.0 | " | 222.0 | " |
| | PM Acetate | 141.0 | " | 141.0 | " |
| | Butanol | 40.0 | " | 40.0 | " |
| | Volumes: | Approximately 100 gal. | | | |

*PM Acetate = propylene glycol methyl ether acetate
Raw material suppliers:
(1) Omya, Inc.
(2) DeGussa Co.
(3) American Cyanamide
(4) Wayne Pigment Co.

Example 13

Test formulation 12.1 (see Example 12) was employed to evaluate corrosion inhibitive activity on aluminum of a pigment grade hybrid symbolized by [0.05Zn(MBT)₂/ ZnNCN+0.5CaSiO₃]/0.02ZrO synthesized per Example 1.2.

The 12.1 test and related control formulations were applied by wire-wound rod on Type A 3003 H14 aluminum panels (from The Q-Panel Co.), at 0.6–0.8 mils thickness, aged for 7 days at room temperature, vertically scribed and subsequently subjected to salt spray exposure (according to ASTM B-117). It will be noted, that the coatings' observed corrosion inhibitive performance is considered being directly proportional to the tested pigment components' corrosion inhibitive activity. Test results are summarized in Table 13.

TABLE 13

| Formulation/ inhibitor pigment | Salt spray exposure time | Observation |
|---|---|---|
| 12.1 Test/hybrid, Example 1.2 | 7000 hours | no blisters coating intact |
| 12.1 Control/SrCrO$_4$ | 7000 hours | no blisters coating intact |

Based on these experimental results, it can be concluded that hybrid pigment of Example 1.2 possesses excellent corrosion inhibitive activity on aluminum, comparable to SrCrO$_4$, the industrial standard for such applications.

Example 14

Test formulations 12.1 and 12.2 were used to assess the corrosion inhibitive activity on copper of pigment grade hybrids symbolized by [0.05Zn(MBT)$_2$/ZnNCN+ 0.5CaSiO$_3$]/0.03ZrO$_2$ and [0.075.Zn-DMTD/ZnNCN] synthesized according to Example 1.2 and Example 6, respectively.

Both test and control formulations were applied on commercially available copper panels, baked, aged for 7 days at room temperature, vertically scribed and subsequently tested. The evaluations of corrosion inhibitive activity of the specified hybrid pigment varieties, compared to SrCrO$_4$ were performed according to an electrolytic procedure, by NIKE-TECH, Inc., of Alvarado Tex., as follows:

Anodically polarized test and control panels were simultaneously immersed in an aqueous electrolyte solution containing —C, and —SO$_4$ species and surfactant at ambient temperature and moderately alkaline pH. After low DC voltage was applied, the physical integrity of the coatings were visually evaluated and performance graded on a 1 (worst) to 5 (best) scale.

It is noted again that coatings' protective performance is considered to be directly proportional to the tested pigment component's corrosion inhibitive activity. Test results are summarized in Table 14.

TABLE 14

| Formulation/ inhibitor pigment | Performance grade of inhibitor pigment |
|---|---|
| Test 12.1/hybrid, according to Example 1.2 | 4 |
| Control 12.1/SrCrO$_4$ | 1 |
| Test 12.2/hybrid, according to Example 6 | 4 |
| Control 12.2/SrCrO$_4$ | 1 |

Based on these test results it can be concluded that hybrid pigments of Examples 1.2 and 6 display excellent corrosion inhibitive activity on copper, substantially better than SrCrO$_4$, the industry standard for such applications.

Example 15

Pigment grade hybrids synthesized according to Examples 1.1, 1.2, 7.1 and 7.2 were tested for their corrosion inhibitive activity on silver, as pigment components of "mirror backing" coating formulations. The test and control formulations employed, known by the industry, are presented below:

TABLE 15.1

| Components | Trade Names/Suppliers | Parts by Weight | |
|---|---|---|---|
| | | Test | Control |
| Resin | Acryloid B-67 (1) | 33.0 | 33.0 |
| Solvent | Xylene | 42.0 | 42.0 |
| Corrosion Inhibitor Pigments | Hybrids (2) | 25.0 | — |
| | ZnNCN (3) | — | 25.0 |
| | | 100.00 | |

(2) of Examples Nos. 1.1, 1.2, 7.1 & 7.2 (3)Pigment grade ZnNCN, manufactured by Wayne Pigment Co., Milwaukee, Wis.; (1) from Rohm & Haas.

The experimental work was performed by Nike-Tech, Inc., Alvarado, Tex., including preparation of Ag mirror substrates, application by dipping of test and control coatings at approximately 1.0 mil dry thickness, 24 hours air drying and vertical scribing of the test panels. The evaluation of corrosion inhibitive activity of the hybrid pigment varieties, compared to ZnNCN, was performed according to the electrochemical procedure described in Example 14. Test results are summarized below.

TABLE 15.2

| Inhibitor Pigment phase composition formula | Example No. | Performance Grade |
|---|---|---|
| [.05 Zn(MBT)$_2$/ZnNCN] | 1.1. | 5 |
| [0.05 ZnMBT)$_2$/ZnNCN + 0.5 CaSiO$_3$]/0.03 ZrO$_2$ | 1.2 | 5 |
| [0.05 Zn(MBI)$_2$/ZnNCN + 0.5 CaSiO$_3$]/0.03 ZrO$_2$ | 7.1 | 4 |
| [0.05 Zn(MTH)$_2$/ZnNCN + 0.5 CaSiO$_3$]/0.03 ZrO$_2$ | 7.2 | 4 |
| ZnNCN, control | * | 4 |

*mfg by Wayne Pigment Co.

Based on the presented experimental results it can be concluded that pigment grade hybrid inhibitors produced according Examples 2.1 and 2.2 possess high corrosion inhibitive activity on silver, being superior in that respect to ZnNCN, a state of the art lead-free pigment recommended for such applications.

Example 16

Pigment grade organic-inorganic hybrid, according to Example 1.2 symbolized by [0.05Zn(MBT)$_2$/ZnNCN+ 0.5CaSiO$_3$]/0.03ZrO$_2$, was evaluated in a solvent based medium oil alkyd test formulation for synergistic behavior for inhibition of steel corrosion. Distinct versions of the test formulation, containing the pigment grade hybrid composition, its phase constituents (pigment grade ZnNCN, CaSiO$_3$-Wollstonite grade, technical grade Zn(MBT)$_2$ produced according to Example 1.3), pigment grade SrCrO$_4$ and zinc phosphate dihydrate (for pigments see Table 16.2), respectively, were sprayed on cold rolled steel panels (from The Q-Panel Co.), at 1.5 mil film thickness. The exhibits were air dried, aged overnight at 130° F., scribed, and subsequently exposed to salt spray conditions for 670 hours, following ASTM B-117 and evaluated by ASTM D-714; the test coatings' overall corrosion inhibitive performances, considered directly proportional with pertinent pigments' corrosion inhibitive activity, were comparatively evaluated and graded on 0 (worst) to 10 (best) scale. The test formulations and results are presented below in Tables 16.1 and 16.2, respectively.

TABLE 16.1

| Components of test formulation | Trade Names & Suppliers | Parts by Weight |
|---|---|---|
| Mill base | | |
| Medium Oil alkyd resin | Duramac 2455 (1) | 273.5 |
| Solvent | Xylene | 25.5 |
| Filler pigments | RCL-535 TiO2 (2) | 86.0 |
| | 40-27 Talc (3) | 56.0 |
| | Sparmite Barytes (4) | 71.0 |
| Antisettling | Bentone 38 (5) | 4.2 |
| Pigment grade corrosion inhibitors | *see Table 16.2. | 25.5 |
| Letdown | | |
| Resin | Duramac 2455 | 240.0 |
| Solvent | Xylene | 72.0 |
| Driers | 6% cobalt drier (6) | 2.1 |
| | 6% Zirco drier (6) | 21.0 |
| Antiskinning | Methyl Ethyl Ketoxyme | 2.1 |
| | Volume (gal): approximately 100 gal | |

Raw material suppliers: (1) McWhorther Technologies; (2) SCM; (3) Pfizer Inc.,Chemical Div.; (4) Harcros; (5) Rheox, Inc.; (6) Interstab Chemicals, Inc.;

TABLE 16.2

Results of evaluation of corrosion inhibition

| Inhibitor Pigment Component of Test Coatings | Status of Test Coatings After 670 Hours | Overall Grading of Pigments' Inhibitive Performance | Observation |
|---|---|---|---|
| $Zn(MBT)_2$ | Test coating could not be cured | 0 | Component of hybrid according to Example 2.2 |
| ZnNCN | Extensive Delamination, Dense Blisters | 0 | * |
| $CaSiO_3$ | Extensive Delamination, Medium Dense Blisters | 0 | * |
| Hybrid According to Example 1.2 | 2–5 mm creepage at scribe, few blisters | 7 | Pigment Displays Synergy |
| Zinc Phosphate-Dihydrate | Extensive Delamination, medium Dense Blisters | 0 | Control Pigment |
| $SrCrO_4$ | Limited Creepage at Scribe, few Blisters | 7–8 | Control Pigment, Standard of the Industry |

Pigment grade hybrid according to Example 1.2, thus, displays synergistically enhanced corrosion inhibitive activity on cold rolled steel, performing substantially better in that sense, than pigment grade $Zn_3(PO_4)_2(H_2O)_2$ and at comparative level to $SrCrO_4$. It is a manifestation of synergy when the pigment composition out performs each of the individual components of which it is constituted.

Example 17

The cure-inhibitive activity of various organic-inorganic hybrid pigments of this invention were evaluated in medium oil alkyd resin based paint formulation described in Table 16.1 using the test procedure describe in Comparative Example 1.4. In this case, however, all hybrid pigments were tested at a load level of 4% by weight of paint formulation and, tack-free applications were considered cured. Data are presented below.

TABLE 17

| Hybrid Pigment | Example No. | Observation: |
|---|---|---|
| [0.05 $Zn(MBT)_2$/ZnNCN] | Ex. 1.1 | No cure inhib |
| [0.05 $Zn(MBT)_2$/ZnNCN + 0.5 $CaSiO_3$]/0.03 $ZrO_2$ | Ex. 1.2 | " |
| [0.075 ZnDMTD/ZnCN] | Ex. 6 | " |
| [0.05 $Zn(MBI)_2$/ZnNCN + 0.5 $CaSiO_3$]/0.03 $ZrO_2$ | Ex. 7.1 | " |
| [0.05 $Zn(MTH)_2$/ZnNCN + 0.5 $CaSiO_3$]/0.03 $ZrO_2$ | Ex. 7.2 | " |
| [0.06 $Zn(n\text{-}pDC)_2$/ZnNCN/0.21 $SrMoO_4$/ 0.1 $Zn_3(PO_4)_2(H_2O)_2$] | Ex. 9 | " |
| [0.05 dCy-MBT/ZnNCN + 0.5 $CaSiO_3$]/0.03 $ZrO_2$ | Ex. 10 | " |
| [0.05 $Zn(CyM)_2$/ZnNCN + 0.5 $CaSiO_3$]/0.03 $ZrO_2$ | Ex. 7.3 | " |
| [0.06 $Zn(DTP)_2$/ZnNCN'/ 0.2 $Zn_3(PO_4)_2(H_2O)_2$ + 0.4 $CaSiO_3$] | Ex. 11 | " |

As observed, no hybrid pigment (tested at 4% by weight) displayed cure inhibitive activity in the oil alkyd paint system. Such behavior indicates, that hybrid pigments synthesized according to the present invention are essentially free of un-reacted thiol compounds. See also Table 1.3 & Comparative Example 1.

Example 18

A multi-component, microcomposite inorganic/inorganic pigment of this invention, characterized by synergistic behavior in respect of inhibition of steel corrosion, symbolized by the theoretical phase composition formula of $$[0.77.Zn_3(PO_4)_2.(H_2O)_4/ZnNCN/0.77.ZnO+2.42.CaSiO_3+0.3.SrCO_3]$$

was synthesized by first preparing the following precursors:

Mixed suspension (A), containing finely ground 1.0 moles (81.38 g.) of ZnO (See Comparative Example 1.1), 0.075 moles (11.0 g.) of commercial grade $SrCO_3$ and 0.6 moles (69.5) of commercial grade $CaSiO_3$ in 1000 ml water, was prepared by extensive agitation at normal temperatures.

Solution (B), containing 0.38 moles $H_3PO_4$/200 ml water.
Solution (C), 0.25 moles of $H_2NCN$/200 ml. water.

Synthesis was carried out at normal temperatures, by introducing (B)into intensively stirred (A), over about one hour. Subsequently, (C) was added gradually into the reaction mixture and the process was completed by maintaining the same reaction conditions for an additional hour. After filtration without washing, the resultant product was dried at 70–80° C. In order to preserve tetrahydrate composition of the zinc phosphate constituent, the presscake was dried at moderate temperature of 70–80° C. and the dry product was subsequently pulverized to a fineness of 100% +270 mesh. Analytical data are presented in Table 18.

TABLE 18

| Measured quality parameters | Determined values |
|---|---|
| Appearance | white powder |
| Zn total % | 32.0 |
| NCN % | 10.7 |
| Carbonate as $SrCO_3$ % | 5.1 |

TABLE 18-continued

| Measured quality parameters | Determined values |
|---|---|
| pH | 7.5 |
| Oil absorption, lbs/100 lbs | 34.0 |
| Spec. gravity | 2.95 |
| H$_2$O % (by loss at 200° C.) | 5.0–6.0 |
| Yield, g. | 210.0 |

What is claimed is:

1. A corrosion-inhibiting composition for application to a metal substrate comprising a film-forming organic polymer which has dispersed therein a corrosion inhibiting pigment phase which comprises composite organic/inorganic hybrid microparticles formed of an inorganic first corrosion inhibiting compound which is interfaced on a microscopic level with micro-particles formed of an organic second corrosion-inhibiting compound, said first and second compounds being distinctly identifiable by spectrum analysis, but physically combined into inseparable component phases having different chemical compositions.

2. A composition according to claim 1 wherein said second compound comprises an organic zinc salt, alkyl-ammonium salt or cycloalkyl-ammonium salt of a mercapto- and/or thio-compound or alkyl-substituted derivative thereof.

3. A composition according to claim 2 wherein the first compound comprises ZnNCN.

4. A composition according to claim 2 wherein the second compound comprises an organic zinc salt, alkyl-ammonium salt or cycloalkyl-ammonium salt of a compound selected from the group consisting of mercaptobenzothiazole, mercaptothiazoline, mercaptobenzimidazole, mercaptoimidazole, 2,5-dimercapto-1,3,4-thiodiazole, 5,5-dithio-bis(1,3,4-thiadiazole-2(3H)-thione, mercaptobenzoxazole, mercaptothiazole, mercaptotriazole, mercaptopyrimidine, mercaptopyridine, mercaptoquinoline, alkyl- and cyclo-alkyl mercaptanes, -alky- or N-cycloalkyl-dithiocarbamates, O-alkyl- or O-cycloalkyl-dithiocarbonates, O,O-dialkyl- and O,O-dicycloalkyl-dithiophosphates, dithiocyanuric acid, trithiocyanuric acid, dimercapto pyridine, 2,4-dithiohydantoin, and 2,4-dimercapto-6-amino-5-triazine.

5. A composition according to claim 1 wherein said microparticles have diameters of approximately 0.5 to 20 microns.

6. A method of providing corrosion resistance to a metal surface which comprises applying to said surface a corrosion-inhibiting composition according to claim 1 in a corrosion-protecting amount.

7. A corrosion-inhibiting composition for application to a metal substrate comprising
a film-forming organic coating composition, and,
a pigment phase which comprises a stable unitary hybrid suspension of microparticles, approximately 0.5 to 20 microns in size, formed of an organic first, corrosion inhibiting compound coated on core inorganic microparticles which comprise a second corrosion-inhibiting compound, said first and second compounds being distinctly identifiable by spectrum analysis, but being in the form of physically inseparable component phases having different chemical compositions.

8. A corrosion-inhibiting composition according to claim 7 which comprises
an inorganic component phase including a cation selected from the group consisting of Zn, Al, Mg, Ca, Sr, Ti, Zr, Ce and Fe and an anion selected from the group consisting of phosphates, polyphosphates, phosphites, molybdates, silicates and cyanamides and combinations thereof, and
an organic component phase including a zinc or alkyl-ammonium salt of a compound selected from the group consisting of mercaptobenzothiazole, mercaptothiazoline, mercaptobenzimidazole, mercaptoimidazole, 2,5-dimercapto-1,3,4-thiodiazole, 5,5-dithio-bis(1,3,4-thiadiazole-2(3H)-thione, mercaptobenzoxazole, mercaptothiazole, mercaptotriazole, mercaptopyrimidine, mercaptopyridine, mercaptoquinoline, alkyl- and cyclo-alkyl mercaptanes, -alkyl- or N-cycloalkyl-dithiocarbamates, O-alkyl- or O-cycloalkyl-dithiocarbonates, O,O-dialkyl- and O,O-dicycloalkyl-dithiophosphates, dithiocyanuric acid, trithiocyanuric acid, dimercapto pyridine, and 2,4-dithiohydantoin, and combinations thereof.

9. A method of forming a hybrid organic-inorganic corrosion-inhibiting micro-composite composition comprising reacting an organic compound selected from the group consisting of mercaptobenzothiazole, mercaptothiazoline, mercaptobenzimidazole, mercaptoimidazole, 2,5-dimercapto-1,3,4-thiodiazole, 5,5-dithio-bis(1,3,4-thiadiazole-2(3H)-thione, mercaptobenzoxazole, mercaptothiazole, mercaptotriazole, mercaptopyrimidine, mercaptopyridine, mercaptoquinoline, alkyl- and cyclo-alkyl mercaptanes, -alkyl- or N-cycloalkyl-dithiocarbamates, O-alkyl- or O-cycloalkyl-dithiocarbonates, O,O-dialkyl- and O,O-dicycloalkyl-dithiophosphates, dithiocyanuric acid, trithiocyanuric acid, dimercapto pyridine, and 2,4-dithiohydantoin, and combinations thereof, with a freshly prepared aqueous suspension of ZnNCN.

10. A method of protecting aluminum from corrosion comprising applying thereto a coating composition comprising a film-forming organic polymer which has dispersed therein a pigment phase comprising
a corrosion inhibiting amount of composite organic/inorganic hybrid microparticles formed of an inorganic first corrosion inhibiting compound which is interfaced on a microscopic level with micro-particles formed of an organic second corrosion-inhibiting compound, said first and second compounds being distinctly identifiable, but physically combined into inseparable component phases having different chemical compositions, said organic corrosion-inhibiting compound comprising
a poly-thiol or poly-mercaptan selected from the group consisting of 2,5-dimercapto-1,3,4-thiodiazole, 5,5-dithio-bis(1,3,4-thiadiazole-2(3H)-thione, dithiocyanuric acid, trithiocyanuric acid, dimercapto pyridine, 2,4-dithiohydantoin, and 2,4-dimercapto-6-amino-5-triazine, and said inorganic corrosion-inhibiting compound being a zirconyl salt selected from the group consisting of zirconyl acetate, Na-zirconium carbonate, K—zirconium carbonate, and ammonium zirconium carbonate.

11. A method of protecting from corrosion a mirror back coating which comprises a metallic silver coating comprising
applying thereto an organic coating composition comprising a poly-thiol or poly-mercaptan selected from the group consisting of 2,5-dimercapto-1,3,4-thiodiazole, 5,5-dithio-bis(1,3,4-thiadiazole-2(3H)-thione, dithiocyanuric acid, trithiocyanuric acid, dimercapto pyridine, 2,4-dithiohydantoin, and 2,4-dimercapto-6-amino-5-triazine.

12. A method of forming a hybrid organic-inorganic corrosion-inhibiting micro-composite composition comprising reacting an organic compound selected from the group consisting of 2,5-dimercapto-1,3,4-thiodiazole, 5,5-dithio-bis(1,3,4-thiadiazole-2(3H)-thione, dithiocyanuric acid, trithiocyanuric acid, dimercapto pyridine, 2,4-dithiohydantoin, and 2,4-dimercapto-6-amino-5-triazine with a water soluble zirconyl salt.

13. A method of forming a hybrid corrosion-inhibiting micro-composite composition comprising providing a previously prepared aqueous dispersion of an inorganic first non-reactive solid component and an organic second non-reactive solid component, gradually introducing an aqueous solution of a water soluble zirconyl salt into said aqueous dispersion while intensively stirring said dispersion, drying said dispersion, thereby developing a hybrid microcomposite of said first and second components encapsulated by said zirconyl salt, said microcomposite being in a particle size range of about 0.5 to 20 microns.

14. A method according to claim 13 wherein said second component comprises an organic zinc salt, alkyl-ammonium salt or cycloalkyl-ammonium salt of a compound selected from the group consisting of mercaptobenzothiazole, mercaptothiazoline, mercaptobenzimidazole, mercaptoimidazole, 2,5-dimercapto-1,3,4-thiodiazole, 5,5-dithio-bis(1,3,4-thiadiazole-2(3H)-thione, mercaptobenzoxazole, mercaptothiazole, mercaptotriazole, mercaptopyrimidine, mercaptopyridine, mercaptoquinoline, alkyl- and cyclo-alkyl mercaptanes, -alkyl- or N-cycloalkyl-dithiocarbamates, O-alkyl- or O-cycloalkyl-dithiocarbonates, O,O-dialkyl- and O,O-dicycloalkyl-dithiophosphates, dithiocyanuric acid, trithiocyanuric acid, dimercapto pyridine, 2,4-dithiohydantoin, and 2,4-dimercapto-6-amino-5-triazine and combinations thereof.

15. A method according to claim 13 wherein said dispersion is moderately heated and pH neutralized during addition of said zirconyl salt.

16. A method according to claim 13 wherein said zirconyl salt is selected from the group consisting of zirconyl acetate, Na-zirconium carbonate, K—zirconium carbonate, and ammonium zirconium carbonate.

17. A method according to claim 13 wherein said process is represented by the formula $$0.04\text{Zr-acetate}+0.1\text{Zn(MBT)}_2+\text{CaSiO}_3 \text{ - - - } pH=7 \rightarrow 0.1\text{Zn(MBT)}_2/0.04\text{poly-ZrO(OH)}_2/\text{CaSiO}_3\text{-dehydrate} \rightarrow [[0.1\text{Zn(MBT)}_2/\text{CaSiO}_3]/0.04\text{ZrO}_2]_{\{0.1}\text{Zn(MBT)}_2/\text{CaSiO}_3\}/0.04\text{ZrO}_2$$

wherein said $0.1\text{Zn(MBT)}_2/\text{CaSiO}_3$ is a microcomposite hybrid product.

18. A composition produced by the method of claim 9.
19. A composition produced by the method of claim 12.
20. A composition produced by the method of claim 13.
21. A composition produced by the method of claim 14.
22. A composition produced by the method of claim 15.
23. A composition produced by the method of claim 16.
24. A composition produced by the method of claim 17.

* * * * *